United States Patent
Kumar et al.

(10) Patent No.: US 6,859,212 B2
(45) Date of Patent: Feb. 22, 2005

(54) INTERACTIVE TRANSACTION CENTER INTERFACE

(75) Inventors: Srihari Kumar, Santa Clara, CA (US); Satyen Desai, San Bruno, CA (US); John Kelley, Palo Alto, CA (US); Blake Earl Hayward, Redwood Shores, CA (US); Jennifer Greene Scott, San Francisco, CA (US); Senthil Kumar Pandurangan, San Jose, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 855 days.

(21) Appl. No.: 09/826,747

(22) Filed: Apr. 4, 2001

(65) Prior Publication Data

US 2002/0007330 A1 Jan. 17, 2002

Related U.S. Application Data

(63) Continuation-in-part of application No. 09/698,708, filed on Oct. 27, 2000, which is a continuation-in-part of application No. 09/425,626, filed on Oct. 22, 1999, which is a continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073.

(51) Int. Cl.[7] .............................................. G06F 15/00
(52) U.S. Cl. ..................... 345/744; 345/762; 705/26
(58) Field of Search ................................ 345/762, 744; 705/14, 26, 27

(56) References Cited

U.S. PATENT DOCUMENTS 6,070,150 A    5/2000 Remington et al.
6,125,352 A    9/2000 Franklin et al.
6,128,603 A   10/2000 Dent et al.
6,313,833 B1 * 11/2001 Knight ....................... 345/764
6,446,045 B1 *  9/2002 Stone et al. ................. 705/26

OTHER PUBLICATIONS

U.S. Appl. No. 09/698,708, Kumar et al.
U.S. Appl. No. 09/425,626, Rangan et al.
U.S. Appl. No. 09/323,598, filed Mar. 26, 2001, Inala et al.
U.S. Appl. No. 09/208,740, Rangan et al.

* cited by examiner

Primary Examiner—Cao Nguyen
(74) Attorney, Agent, or Firm—Donald R. Boys; Central Coast Patent Agency, Inc.

(57) ABSTRACT

A transaction module having a summary interface is provided as part of a software suite for enabling viewing and manipulation of multiple categories of aggregated data compiled from a plurality of data sources and accessible through a single interfacing node operated on a data-packet-network. The transaction module comprises, an interactive main interface accessible through the summary interface, the main interface for listing new transactions related to registered financial accounts, an interactive history link embedded in the main interface for providing access to a secondary interface for viewing transaction history, an interactive menu provided within the main interface for assigning categories to the listed transactions, an interactive save feature for saving category assignments to the listed transactions; a interactive bill-payment link provided within the main interface for linking the interface to a bill-payment module and an interactive transfer-funds link provided within the summary interface of the module for linking the summary face of the module to a secondary interface for transferring funds from one account to another. A user operating the main interface from a remote node having access to the data-packet-network may view all transactions according to option of category, account, and time period.

27 Claims, 23 Drawing Sheets

YODLEE CALENDAR — My Dashboard

JULY 18 - 24, 2000

Tuesday, July 18th
5:00pm  UEKd: Auction Closing - Item: Golf Clubs HighBid: $240

Wednesday, July 19th

Thursday, July 20th
6:00am  United Airlines: Flight Departure  Flight # UAL490 Departing SFO
10:00am  Hilton Hotel Reservations: Room Booked - New York Hilton, Single Room

Thursday, July 20th
All Day  CitiBank MasterCard: Bill Due - Amt. $2100

Friday, July 21st
9:00am - 9:00am  Tee Time - Silver Vista Golf Club. Call Jim.

Saturday, July 22nd
All Day  Amazon.com: Back Order 1209043 Due to ship - Item: Harry Potter Price: $20
All Day  Pacific*Bell: Bill Due - Amt. $100

Sunday, July 23rd
All Day  PG&E: Bill Due - Amt. $100.34

Monday, July 24th
All Day  American Express: Bill Due - Amt. $1200.30

Show:
- Auctions
- Shopping
- Travel
- Bills
- Banking
- Credit Cards
- Investments Click on an Account to log in

Transaction Center - Default View

Fig. 18

Transaction Center: One Account View

*Fig. 19*

Transaction Center: Transaction History / All Accounts

TRANSACTION HISTORY

Select an Account: [All Accounts ▼]
- Chase Credit Card
- American Express
- BankOne Checking

325

Select a Timeframe: [YTD ▼]
- This Month
- Last 6 months
- Last 12 months

327

Select a View: [By Category ▼]
- Chronological
- Auto
- Charitable Contributions
- Entertainment
- Food and Beverage

329

331

[Display]

Transaction History - All Accounts

| Date | Description | Category | Account | Amount |
|---|---|---|---|---|
| 01/03/00 | Payment to Bob Formichi | Housing | BankOne Checking | $1,600.00 |
| 01/03/00 | Final Final | Food and Beverage | Chase Mastercard | $27.85 |
| 01/03/00 | The Fillmore | Entertainment | American Express | $154.32 |
| 01/05/00 | Brake Repair Shop | Auto | Chase Mastercard | $553.36 |
| 02/04/00 | Payment to Bob Formichi | Housing | Chase Mastercard | $800.00 |
| 02/04/00 | Shoreline Amphitheater | Entertainment | Chase Mastercard | $88.44 |
| 03/04/00 | Big O Tires | Auto | American Express | $432.21 |
| 03/05/00 | TicketMaster | Entertainment | BankOne Checking | $145.34 |
| 03/06/00 | Payment to Bob Formichi | Housing | BankOne Checking | $800.00 |
| 04/07/00 | Clementines | Food and Beverage | Chase Mastercard | $167.67 |
| 04/15/00 | American Heart Association | Charitable Contributions | First USA Card | $200.00 |
| 04/31/00 | Great American Music Hall | Entertainment | American Express | $198.20 |
| 04/31/00 | Payment to Bob Formichi | Housing | American Express | $800.00 |
| | | | | $6,067.39 |

[Chart It] 333

[Edit Categories] 335

Expenses

[<< Previous] [Next >>]

Transaction Center: Transaction History / All Accounts - By Category; YTD

TRANSACTION HISTORY

Select an Account: All Accounts [Chase Credit Card / American Express / BankOne Checking] — 325

Select a Timeframe: YTD [This Month / Last 6 months / Last 12 months] — 327

Select a View: By Category [Chronological / Auto / Charitable Contributions / Entertainment / Food and Beverage] — 329

[Display] — 321

Chart It — 333

Transaction History - All Accounts

| Date | Description | Category | | |
|---|---|---|---|---|
| Auto | | | | |
| 01/05/00 | Brake Repair Shop | Auto | Chase Mastercard | $553.36 |
| 03/04/00 | Big O Tires | Auto | American Express | $432.21 |
| Auto Total | | | | $985.75 |
| Charitable Contributions | | | | |
| 02/05/00 | Pomona College | Charitable Contributions | First USA Card | $100.00 |
| 04/15/00 | American Heart Association | Charitable Contributions | First USA Card | $200.00 |
| Charitable Contributions Total | | | | $300.00 |
| Entertainment | | | | |
| 01/03/00 | The Fillmore | Entertainment | American Express | $154.32 |
| 02/04/00 | Shoreline Amphitheater | Entertainment | Chase Mastercard | $8.44 |
| 03/05/00 | TicketMaster | Entertainment | BankOne Checking | $145.34 |
| 04/31/00 | Great American Music Hall | Entertainment | American Express | $198.20 |
| Entertainment Total | | | | $586.30 |
| Food and Beverage | | | | |
| 01/03/00 | Final Final | Food and Beverage | Chase Mastercard | $27.85 |
| 04/07/00 | Clementines | Food and Beverage | Chase Mastercard | $167.67 |
| Food and Beverage Total | | | | $195.52 |
| Housing | | | | |
| 01/03/00 | Payment to Bob Formichi | Housing | BankOne Checking | $1,600.00 |
| 02/04/00 | Payment to Bob Formichi | Housing | Chase Mastercard | $800.00 |
| 03/06/00 | Payment to Bob Formichi | Housing | BankOne Checking | $800.00 |
| 04/31/00 | Payment to Bob Formichi | Housing | American Express | $800.00 |
| Housing Total | | | | $4,000.00 |
| Expenses YTD | | | | $6,067.39 |

Edit Categories — 335

INTERACTIVE TRANSACTION CENTER INTERFACE

CROSS-REFERENCE TO RELATED DOCUMENTS

The present invention is a continuation in part (CIP) to patent application Ser. No. 09/698,708 entitled "Interactive Activity Interface for Managing Personal Data and Performing Transactions Over a Data Packet Network" filed on Oct. 27, 2000, which is a CIP to patent application Ser. No. 09/425,626 entitled "Method and Apparatus for Providing Calculated and Solution-Oriented Personalized Summary-Reports to a User through a Single User-Interface" filed on Oct. 22, 1999, which is a CIP to a patent application Ser. No. 09/323,598 entitled "Method and Apparatus for Obtaining and Presenting WEB Summaries to Users" filed on Jun. 1, 1999, now U.S. Pat. No. 6,199,077, which is a CIP to patent application Ser. No. 09/208,740 entitled "Method and Apparatus for Providing and Maintaining a User-Interactive Portal System Accessible via Internet or other Switched-Packet-Network" filed on Dec. 8, 1998, now U.S. Pat. No. 6,412,073, disclosures of which are incorporated herein in their entirety by inclusion and reference.

FILED OF THE INVENTION

The present invention is in the field of Internet navigation including various communication means and connection technologies. The present invention pertains more particularly to an interactive software functionality enabling management and transactional control including categorized viewing of personal transaction data including account data maintained on behalf of users by an entity providing data compilation, aggregation, and summary services.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in patent application Ser. No. 09/208,740 entitled "Method and Apparatus for Providing and Maintaining a User-Interactive Portal System Accessible via Internet or other Switched-Packet-Network", provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

In addition to the features described above, patent application Ser. No. 09/523,598 entitled "Method and Apparatus for Obtaining and Presenting WEB Summaries to Users" describes a software agent used in conjunction with a search function that is enabled to navigate to any URL or group of URL's, provided as input by a user or otherwise deemed appropriate by the service provider, for the purpose of providing summary information regarding updated content for each URL, which may be presented as an HTML information-page to the user.

The above described service uses known site logic for navigating to specific "chunks" of data contained in Web pages at the site. Logic scripts are prepared by knowledge workers operating on behalf of users. With such scripts, gatherer agents may navigate directly to data portions that users are interested in.

Users who subscribe to many on-line services generally do all of their banking, investing, travel arranging, shopping, and so on while on-line with the Internet. Having all of his or her services available at one portal provides a convenience to a user in not having to remember a plurality of passwords, or to be required to physically log-on to each site. Similarly, the ability to obtain summary data associated with selected sites through one interface allows a user to greatly speed any decision making process related to his or her on-line activity. However, summary information may not help a user with certain other concerns. For example, obtaining accurate financial information concerning his entire portfolio of banking and investments would require much user calculation depending on the exact nature of the result desired. Similarly compiling a trend that reflects a user's on-line activity at a plurality of shopping services may also require considerable calculation to be performed by a user. Summary data presented in the above methods is general in nature and reflects such as updates, status of orders, and the like.

An Internet-connected portal system, known to the inventor, has a data repository, a data-gathering system, a request processor, a plurality of report algorithms, and a report processor. The request processor receives a request from a user and matches the request to an individual one of the report algorithms. The data-gathering subsystem accesses plural Internet sites associated with the user and extracts raw data therefrom according to needs of the report algorithm. The report processor processes the raw data according to the report algorithm into meta-summarized information defined by the report algorithm, and the portal system transmits the meta-summarized information as a report to a destination associated with the report request. In some cases there is an aggregated-data database in the data repository storing aggregated data retrieved for specific users periodically, and the request processor checks the aggregated-data database for needed data before requiring the data-gathering system to retrieve data from the associated Internet sites. In the instance that the needed data is stored in the aggregated-data database, the report is prepared from the aggregated data. Reports may be presented in a form such as to include text and graphic formats.

In view of various functional enhancements including the ability to provide calculative and solution-oriented reporting, it has occurred to the inventor that a single interface, through which summary and detailed data may be viewed and manipulated must be provided that is user-friendly, compact and interlinked in terms of request-to-result functionality wherein access and request actions may be performed by working within any category or department of data that may be available to be viewed through the interface. Current and prior-art interactive interface software used with typical data presentation services lacks the flexibility of providing multiple points of intractability within the interface as well as enabling cross-solution implementation across multiple categories of data viewable through the interface.

The above challenges exist with prior-art services in part because they lack much of the interactive capability required in order to enable a fully functional data interface, especially one that interfaces a user with a wide range of disparate data categories.

A software suite known to the inventor for enabling viewing and manipulation of multiple categories of aggregated data compiled from a plurality of data sources and accessible through a single interface operated on a data-packet-network is provided. The data sources are available for direct network-access through multiple access points available from within the interface. The software suite comprises, a calendar module having at least one display interface for enabling viewing and manipulation of time and date-sensitive calendar data, a transaction module having at least one display interface for enabling viewing and manipulation of financially oriented account data, a portfolio tracking module having at least one display interface for enabling viewing and manipulation of investment oriented account data, a net-worth reporting module having at least one display interface for displaying a solution-oriented net-worth report compiled from the aggregated, a bill-payment module having at least one display interface for enabling viewing and initiation of payment action regarding current billing data and an account-alert module having at least one display interface for reporting time and event sensitive account alerts related to changes in account data due to occurring events or pre-configured time parameters.

A user operating a remote node connected to the network of a server hosting the software suite may view and manage personal data. In preferred embodiments, the data requests received at the server from the user regarding data management and manipulation are performed by proxy when such requests require navigation and/or solution oriented calculations and presentations. In this specification further novel functions related to the transaction management and categorized viewing capabilities of the transaction module described above are taught in enabling detail.

SUMMARY OF THE INVENTION

In a preferred embodiment of the present invention, a transaction module having a displayable summary interface is provided as part of a software suite for enabling viewing and manipulation of multiple categories of aggregated data compiled from a plurality of data sources and accessible through a single interfacing node operated on a data-packet-network. The transaction module comprises, an interactive main interface accessible through the summary interface, the main interface for listing new transactions related to registered financial accounts, an interactive history link embedded in the main interface for providing access to a secondary interface for viewing transaction history, an interactive menu provided within the main interface for assigning categories to the listed transactions, an interactive save feature for saving category assignments to the listed transactions, an interactive bill-payment link provided within the main interface for linking the interface to a bill-payment module and an interactive transfer-funds link provided within the summary interface of the module for linking the summary face of the module to a secondary interface for transferring funds from one account to another.

A user operating the main interface from a remote node having access to the data-packet-network may view all transactions according to option of category, account, and time period.

In a preferred embodiment, the transaction module is accessed through the Internet network. In this aspect, the plurality of data sources are services accessible over the Internet and subscribed to by the operating user. Also in this aspect, the accessible services are hosted in file servers addressed on the Internet network. In one embodiment, the above-mentioned remote node is a personal computer with accessibility to the Internet and the summary, main and secondary interfaces are provided in the form of hyper-text-markup-language. In another embodiment, the remote node is a cellular telephone with accessibility to the Internet. In still another embodiment, the remote node is a hand-held computer with accessibility to the Internet.

In all aspects, the interactive menu within the main interface contains a selectable list of transaction categories including food and beverage, utilities, home, auto, charitable contribution, and entertainment. In this same aspect, the secondary interface invoked from the interactive history link contains a plurality of interactive menus, the menus containing selectable options for categorical viewing of transaction history. The selectable options enable viewing transactions by a specific account, a specified timeframe, and by a selected category, the options are selectable for ordering combinations of criteria for producing a transaction view.

In one aspect, the transaction module further comprises a charting feature for rendering a transactional view in the form of a graphics chart. In this aspect, the graphics chart ordered and displayed is alterable by changing selection of options within the plurality of interactive menus in the secondary interface and refreshing the interface.

In another aspect of the present invention, an interactive transaction viewing system for enabling online viewing of itemized transactions performed across disparate on-line accounts and services over a data-packet-network is provided. The interactive viewing system comprises, a first server node connected to the network, the server node providing a service-access-point for accessing users, a second server node connected to the network and accessible to the first server node, the second server node providing automated navigation, data procurement, and data aggregation on behalf of the accessing users, a plurality of server nodes connected to the network and accessible to the second server node, the server node functioning as data sources for the data procurement and aggregation and a transaction viewing software interface installed on the first server node, the interface accessible to the accessing users connected to the network by respective remote computer nodes.

Users accessing the first server node from the remote computer nodes interact with the transaction-viewing interface for the purpose of viewing transactions according to ordered category and graphical presentation option. The transactions are entered manually or detected automatically through system updates and or user requests. Additionally, the transactions are compiled and aggregated by proxy using cooperative functions of the first and second server nodes.

In a preferred embodiment, the system is implemented on the Internet network. In one aspect, the first server node is a portal server providing personalized interfaces of the form of hyper-text-markup-language interfaces. In this aspect, the on-line accounts and services are accessible over the Internet and subscribed to by the accessing users. In one embodiment, the remote computer nodes are personal computers with accessibility to the Internet. In another embodiment, the remote computer nodes are cellular telephones with accessibility to Internet. In still another embodiment, the remote computer nodes are hand-held computers with accessibility to the Internet. In another aspect of the interactive transaction-viewing system, the second server node stores aggregated data in a connected data repository held externally from the server. In another aspect, the transaction-viewing software interface is linked to at least one secondary interface provided in the form of hyper-text-markup-language. In still another aspect, an interactive menu is accessible from within the transaction viewing interface, the menu containing a selectable list of transaction categories including food and beverage, utilities, home, auto, charitable contribution, and entertainment, each category assignable to a selected transaction listed in the interface, the assignments savable to the system.

Also in one aspect, a secondary interface accessible from interaction within the main interface contains a plurality of interactive menus, the menus containing selectable options for categorical viewing of transaction history. The selectable options enable viewing transactions by a specific account, a specified timeframe, and by a selected category. Additionally, the options are selectable for ordering combinations of criteria for producing a transaction view, wherein the transaction view comprises an ordered history view.

In another aspect, the transaction-viewing system further comprises a charting feature associated with the selectable options. The charting feature renders a transactional view in the form of a graphics chart. In this aspect, the graphics chart ordered and displayed is alterable by changing selection of options within the plurality of interactive menus in the secondary interface and refreshing the interface.

In another aspect of the present invention, a method for ordering and viewing transaction data presented in an interactive transaction-viewing interface accessible through a data-packet-network is provided. The method comprises the steps of: (a) accessing an interactive transaction-viewing interface from a remote node connected to the network, (b) selecting a categorical criteria for viewing transactions from one or more interactive menus accessible through the interface, (c) submitting the categorical criteria, the criteria used to calculate and render the transaction data and (d) viewing the resulting display of transaction data.

In a preferred embodiment, the method is practiced on the Internet network. In one aspect of the method in step (a), the interactive transaction-viewing interface is a personalized hyper-text-markup-language interface served by a portal server connected to the network. In another aspect of the method in step (a), the remote node is a personal computer with accessibility to the network. In still another aspect in step (a), the remote node is a cellular telephone with accessibility to the network. In another aspect, the remote node is a hand-held computer with accessibility to the network. In preferred aspects of the method in step (b), the categorical criteria for viewing transactions include account, timeframe, and by category including food and beverage, utilities, home, auto, charitable contribution, and entertainment. Also, in one aspect in step (b), an additional option is presented for ordering a graphic chart according to the selected criteria.

Now for the first time an interactive transaction-viewing module is provided enabling a user to order a multiplicity of transactional history views according to selected criteria wherein all of the optional views are attainable through a single interface.

BRIEF DESCRIPTION OF THE DRAWING FIGURES

FIG. 12 is an exemplary screen shot of a secondary interface invoked as a result of user interaction with module 219 of FIG. 11 according to an embodiment of the present invention.

FIG. 17 is an exemplary screen shot of a personalized interactive interface suite including a transaction center module according to embodiment of the present invention.

FIG. 18 is an exemplary screen shot of the Transaction Center—Default view of FIG. 13 caused to display through interaction with View Transactions button 307 of FIG. 17.

FIG. 19 is an exemplary screen shot of a Transaction Center according to an embodiment of the present invention.

FIG. 20 is an exemplary screen shot of the transaction center: transaction history/all accounts interface which is accessed by clicking on the transaction history button 319 of FIG. 18 or FIG. 19.

FIG. 21 is an exemplary view of a screen shot that displays transaction history/all accounts—by category: YTD.

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
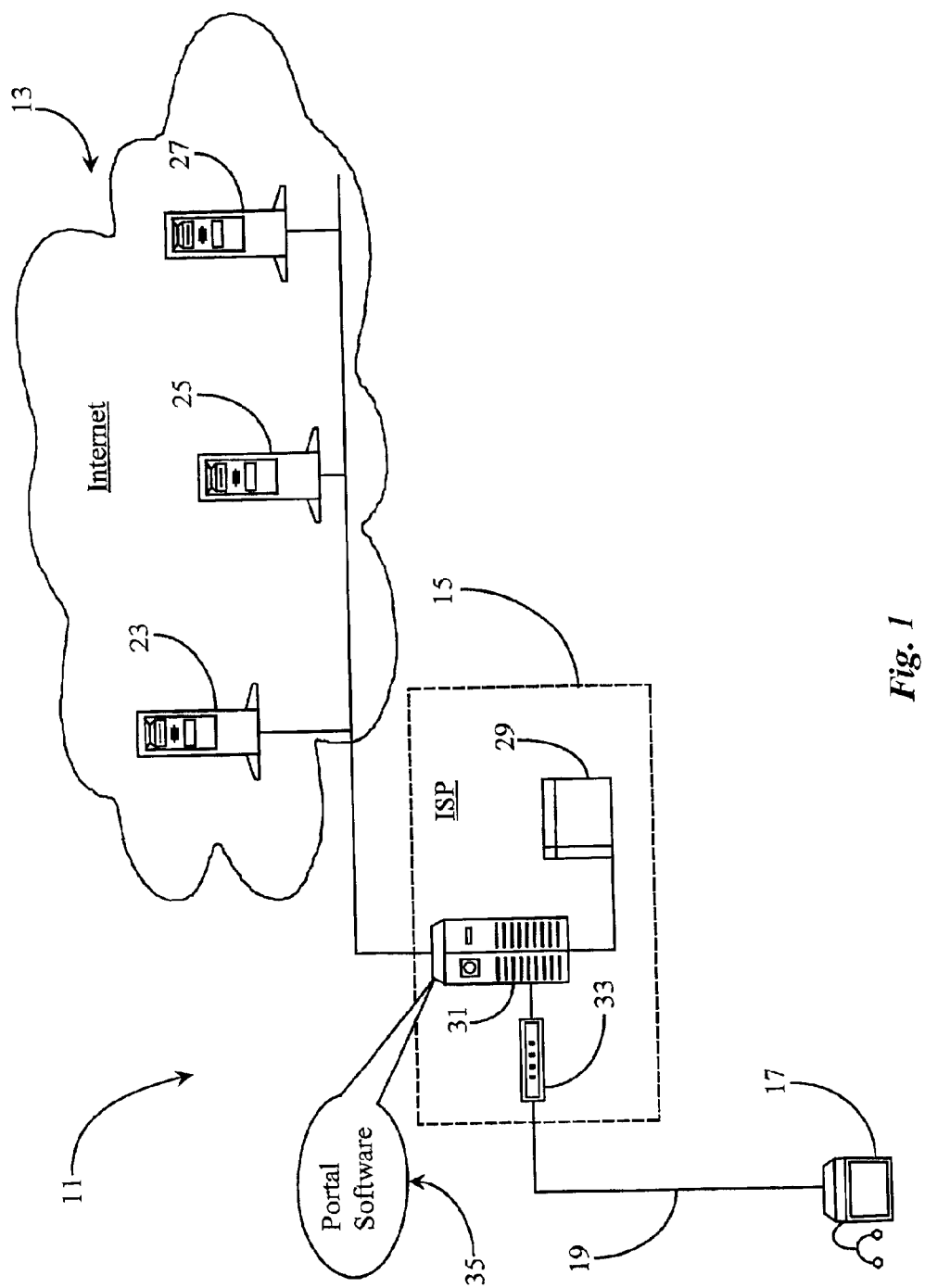
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on.

In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
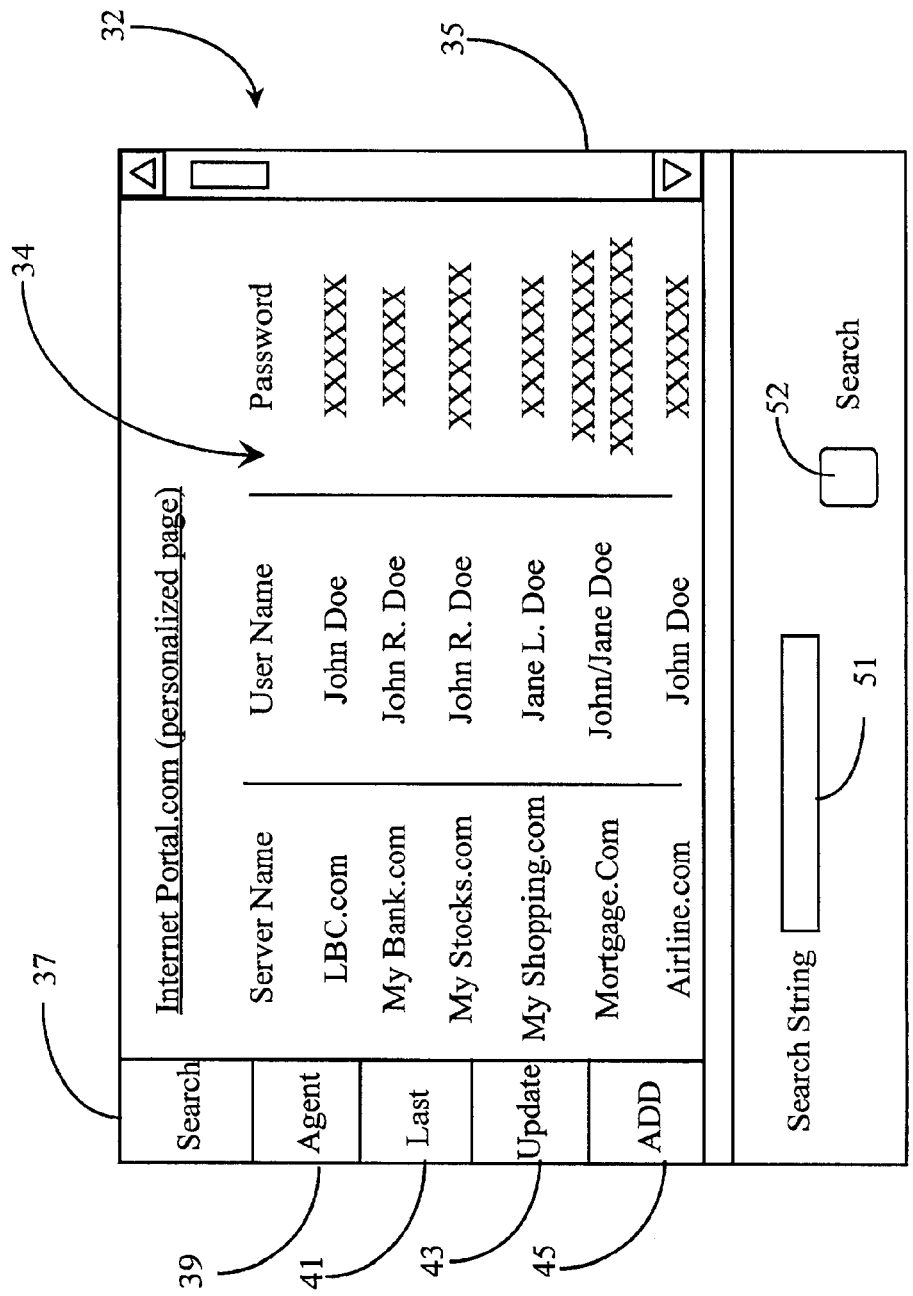
FIG. 2 is an exemplary plan view of a personalized portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password-All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
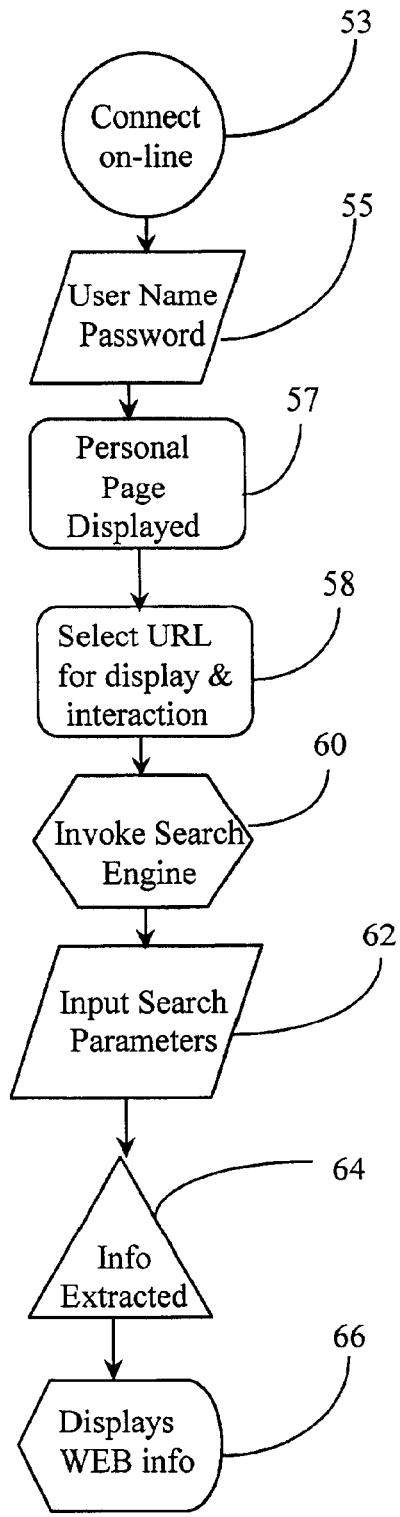
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
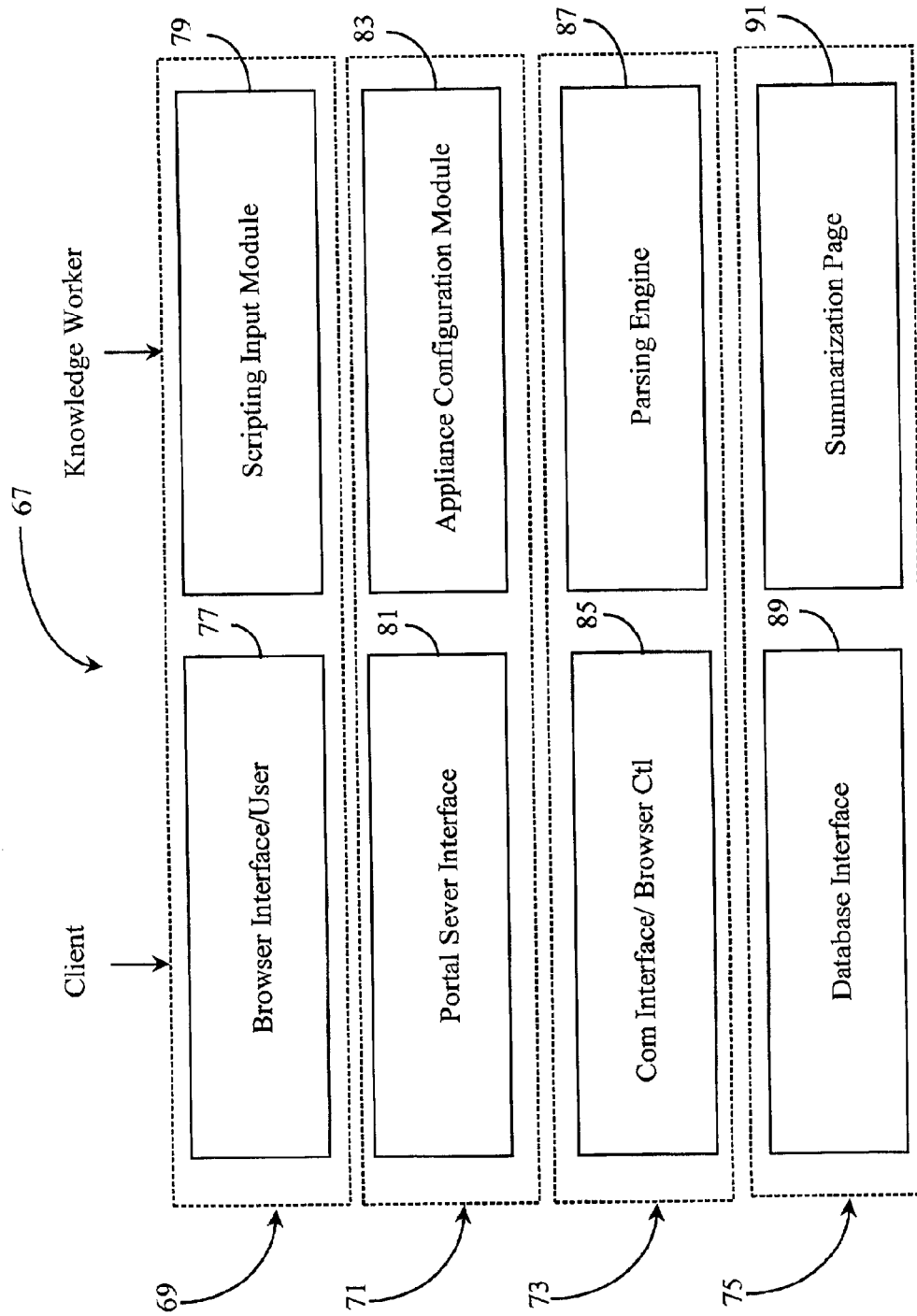
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, in one embodiment, be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform it's function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment, one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

```
# Site amazon.orders.x - shows status of orders from Amazon
login( 7 );
get( "/exec/obidos/order-list/" );
my @tables = get_tables_containing_text( "Orders:" );
my $order_list = new Yodlee::ObjectHolder( 'orders' );
$order_list->source( 'amazon' );
$order_list->link_info( get_link_info() );
my @href_list;
my @container_list;
foreach my $table ( @tables ) {
    my @rows = get_table_rows();
foreach my $i ( 0 . . $#rows ) {
    select_row( $i );
    my $text = get_text( $rows[ $i ] );
    next if $text =~/Orders:|Status/;
    my @items = get_row_items();
    next unless @items >= 4;
    my( $order_num, $date, $status );
    select_cell( 1 );
    $order_num = get_cell_text();
    my $href = get_url_of_first_href( get_cell() );
    select_cell( 2 );
    $date = get_cell_text();
    select_cell( 3 );
    $status = get_cell_text();
    next unless defined $order_num and defined $date and defined
$status;
    my $order = new Yodlee::Container( 'orders' );
    $order->order_number( $order_num );
    $order->date( $date );
    $order->status( $status );
    $order_list->push_object( $order );
    if( defined $href ) {
        push( @href_list, $href );
        push( @container_list, $order );
foreach my $i ( 0 . . $#href_list ) {
    get( $href_list[$i] );
    @tables = get_tables_containing_text( "Items Ordered:" );
foreach my $table ( @tables ) {
    my @rows = get_table_rows();
foreach my $j ( 0 . . $#rows ) {
    select_row( $j );
    my $href = get_url_of_first_href( get_row() );
    next unless defined $href;
    my @child_list = get_children( get_row(), 'a' );
    next unless defined $child_list[ 0 ];
    my $text = get_text( $child_list[ 0 ] );
    $container_list[ $i ]->description( $text );
        }
    }
}
result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment, metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at it's own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes it's site logic parameters, in which case, the new logic must be accessed and any existing templates must be updated, or a new template may be created for the site. The templates contain site-specific script obtained from the site and stored by the knowledge workers. In one embodiment, companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user wishes to subscribe, or register at a new site, only the identification of the site is required from the user as long as his pertinate information has not changed. If a new password or the like is required, gatherer 67 through control module 73 may present login or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
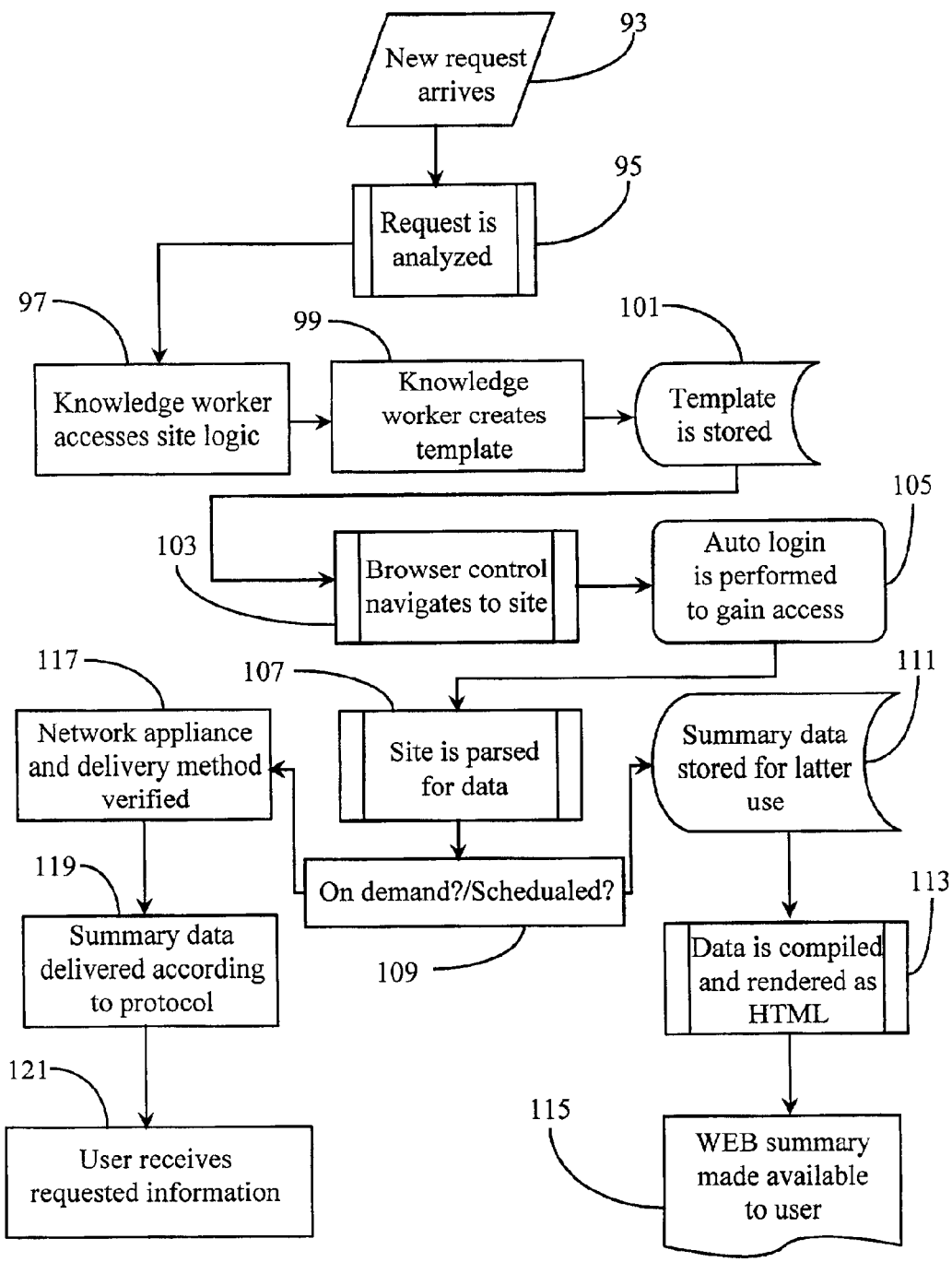
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment, the knowledge worker may notify the browser control to get the template for it's next task. In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for later use in step 111. In step 113, the summary data is rendered as HTNL if not already formatted, and displayed in the form of a summary WEB-page in step 115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user)

is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
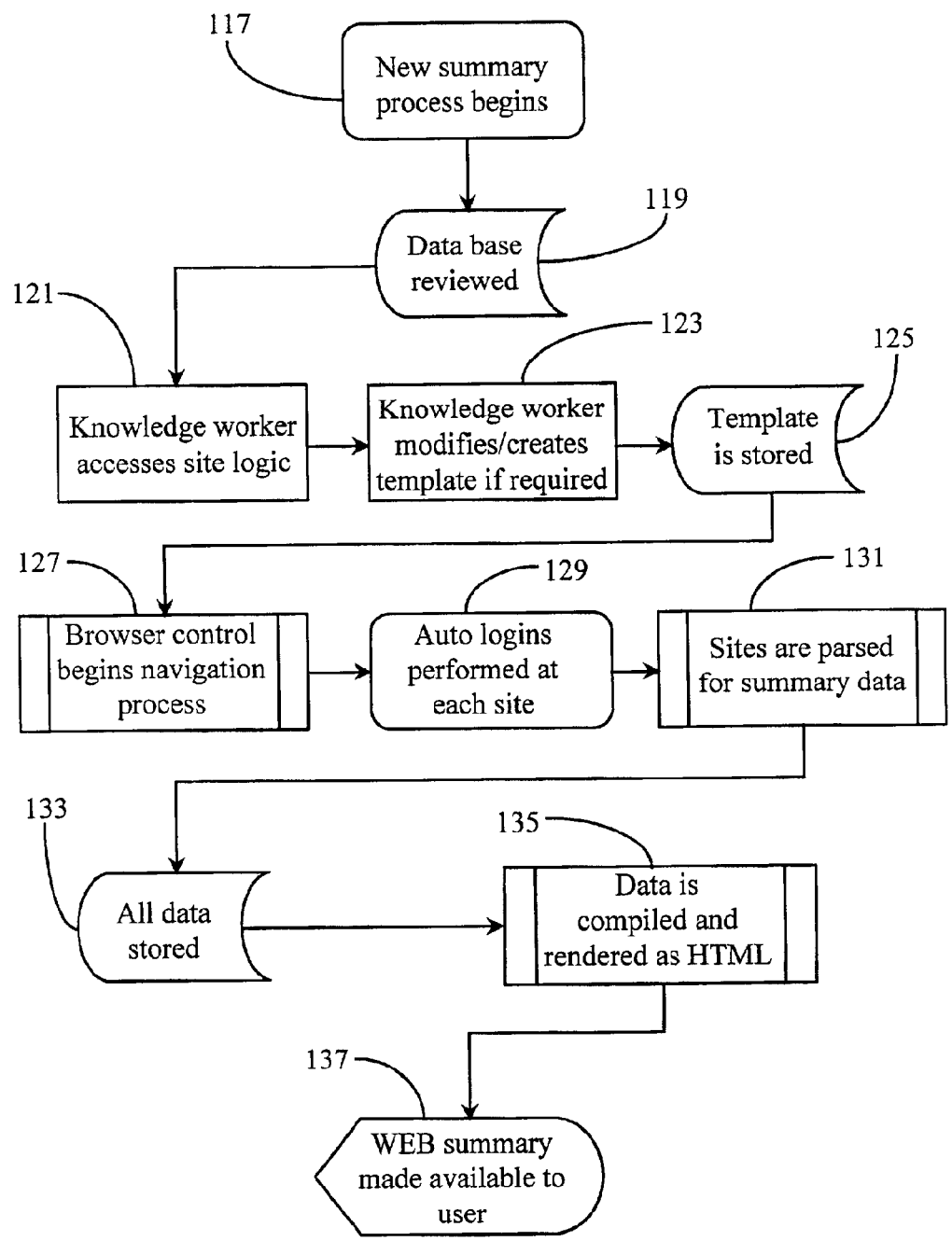
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of it's existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Presenting Meta-Summarized Reports

In another aspect of the present invention, a method is provided largely through unique software wherein summary reports may be ordered and presented to users, the reports reflecting calculated and solution-orientated results. This type of summarizing is termed meta-summarization by the inventors, because it is a summarization over a plurality of data sources. Such a method is described in enabling detail below.

Figure 7:
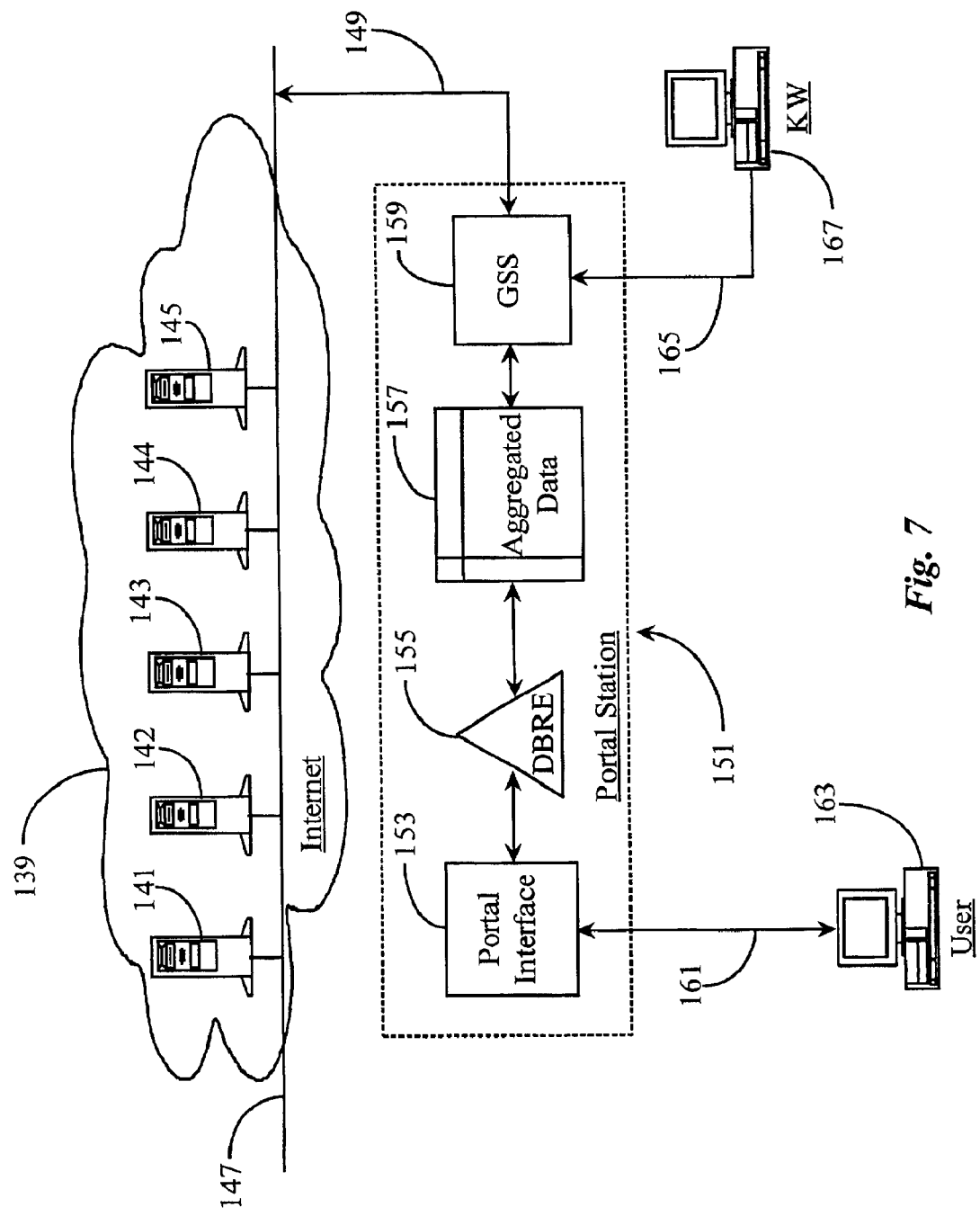
FIG. 7 is an overview of a meta-summarization process according to an embodiment of the present invention.

FIG. 7 is an overview of a meta-summarization process according to an embodiment of the present invention. The term "meta-summary" is used by the inventor in this embodiment also to distinguish the meta-summary process taught herein from the summary process taught above in this specification; in that meta-summarizing involves interpreting and calculating data for reporting a solution-orientated result derived from data retrieved from multiple network sources.

In this embodiment, a portal station 151 is provided and adapted by virtue of software and hardware, to perform WEB-summary and presentation services according to embodiments described in the co-patent applications listed above. Station 151 may be an ISP, a main Internet server, or other network connected server or interface station. In this example, portal station 151 is continuously connected to a source network, which is in this embodiment, the Internet network represented by Internet cloud 139. The above-described network connection is afforded by an Internet-connection line 149 from station 151 to an Internet backbone 147. Internet backbone 147 represents all lines and connections, including sub-nets that make up a global Internet 139.

Portal station 151 has a means provided therein for maintaining a portal interface 153. Portal interface 153 is a file-server interface in this example, however in other embodiments, differing types of network-interface hardware may be substituted therefor. Interface 153 provides hyper-text-transfer protocol (HTTP) pages over an Internet-connection such as path 161 to subscribing users operating such as an illustrated network-adapted PC 163. A user operating PC 163 may go on-line, in this case by such as a dial-up connection, and communicate with portal interface 153 over connection path 161. Connection path 161 may be a normal telephone line, an ISDN line, or another known type of Internet-connection link including wireless connection. A dial-up connection is illustrated herein only as a more common connection method.

A data repository 157 is provided within station 151 and adapted to warehouse aggregated data on behalf of and about a user. Data repository 157 may be part of the same hardware supporting portal interface 153 or it may be a separate hardware implementation connected by a data link. Repository 157 may be of the form of optical storage, or any other known implementation used for storing large amounts of digital data. Repository 157 may be assumed to support varied database programs as may be required to manipulate and organize data or metadata stored therein.

A data gathering sub-system GSS 159 is provided within station 151 and is adapted as a software and hardware implementation capable of navigating data-packet networks, such as Internet 139, upon instruction. GSS 159 represents automated browser control/navigation as described in co-pending patent application Ser. No. 09/523,598. GSS 159 is analogous to navigation layer 73 described in FIG. 4 above.

A plurality of network-connected data sources represented herein by file/data servers 141–145 are illustrated in Internet 139. Servers 141–145 are user-subscribed servers known to portal station 151. For example, servers 141–145 may represent one user's collective WEB-services for banking and investment. Such options include banking, stock trading, retirement account servers, insurance servers, and so on. It is noted here that servers 141–145 are assumed to represent separate WEB-based services subscribed to by one user and are not affiliated with one another. For example, a user operating such as PC 163 would do all of his on-line banking, trading, and investing using servers 141–145 in this example.

In another embodiment, servers 141–145 may represent all of a user's frequented on-line shopping services. The fact that all of servers 141–145 are topically related but not affiliated with one another in this example serves only to aid in explanation of the present invention as will be seen below.

It is taught in the co-pending patent application entitled "Method and Apparatus for Obtaining and Presenting WEB Summaries to Users" that site navigation, parsing data, and returning data to users or storage is enabled, in part, by site-logic templates provided typically by knowledge workers. This aspect is represented herein by a PC 167 adapted for a knowledge worker (KW). A KW working from a station such as PC 167 provides site-logic scripts for navigation to data requested by a user and stored in any one of or all of servers 141–145. Such scripts are provided to GSS 159 over a data link 165. Summary data stored in such as repository 157 is stored for user access. In some cases wherein a user requests immediate data return, data is sent directly to such as portal interface 153 where a user may then access the data immediately.

According to an embodiment of the present invention, a novel database-reporting engine DBRE 155 is provided and adapted to perform formulative processes to aggregated data on behalf of a user. DBRE 155 is in itself a database utility and is in a preferred embodiment a part of the software environment of repository 157. In another embodiment DBRE 155 may be part of the software environment of portal interface 153.

In this embodiment, DBRE 155 acts as a first "gathering agent" and checks repository 157 first for user requested data upon request. User-history records of all user transactions at all of his registered WEB-based services are preferably maintained in repository 157 and are accessible to DBRE 155. In some cases, services such as those represented by servers 141–145 may provided complete transaction histories that may be obtained and stored in repository 157 and updated periodically. In some cases however, such services may not retain history records for users. In this case, a user accessing such services through his or her portal interface 153 may track each transaction over a normal course of time resulting in a history record for transactions at that service that is maintained in repository 157.

In the case of servers 141–145, each contains some form of financial portfolio data connected to one user. For example, server 141 may represent a banking service where a user has a savings account. Server 142 may represent a banking service where the user has a checking account. Server 143 may represent an on-line investment company maintaining a fast-changing portfolio of investments and losses for the particular user. Server 144 may represent a banking company where the user has an individual retirement account (IRA). Server 145 may represent a mortgage company holding data about the users property portfolios. Each site presumably holds current account-status information and a financial history of transactions performed by a particular user.

To illustrate, assume that all financial data particular to one user is provided by or obtained from servers 141–145, aggregated in data repository 157, and updated periodically. A user operating PC 163 may access portal interface 153 by way of Internet connection 161 and request a specific result that involves some or all of the data across multiple servers 141–145. One example would be a user-initiated command "calculate my current net-worth". The resulting meta-summarized report would inform a user of his or her calculated net-worth with all financial data from all financial data-sources (servers 141–145) analyzed in the process of answering the user query.

In this case DBRE 155 utilizes only data that is already aggregated in repository 157. Therefore, it is not specifically required that GSS 159 navigate on behalf of the user in a case where data held in aggregation is current and sufficient to satisfy a user request. However, if a user's particular request, such as the one stated in the above example, requires navigation to one or more of servers 141–145, GSS 159, using site logic provided by KW 167, would navigate to each required site and retrieve the required data. After the required data is aggregated in repository 157, DBRE 155 may analyze the aggregated data and generate an accurate report from the aggregated data based on a user's request.

It will be apparent to one with skill in the art that providing a unique engine such as DBRE 155 on a user-side of repository 157 saves precious bandwidth resource required by individual site navigation and return of data ordered by a user. Added storage space is required in repository 157 for the purpose of storing complete activity histories from multiple WEB services on behalf of users. However, adding such resource and saving bandwidth represents an intelligent implementation in light of the many techniques known in the art for compressing and archiving data. More detail about the function of DBRE 155 is presented below.

Figure 8:
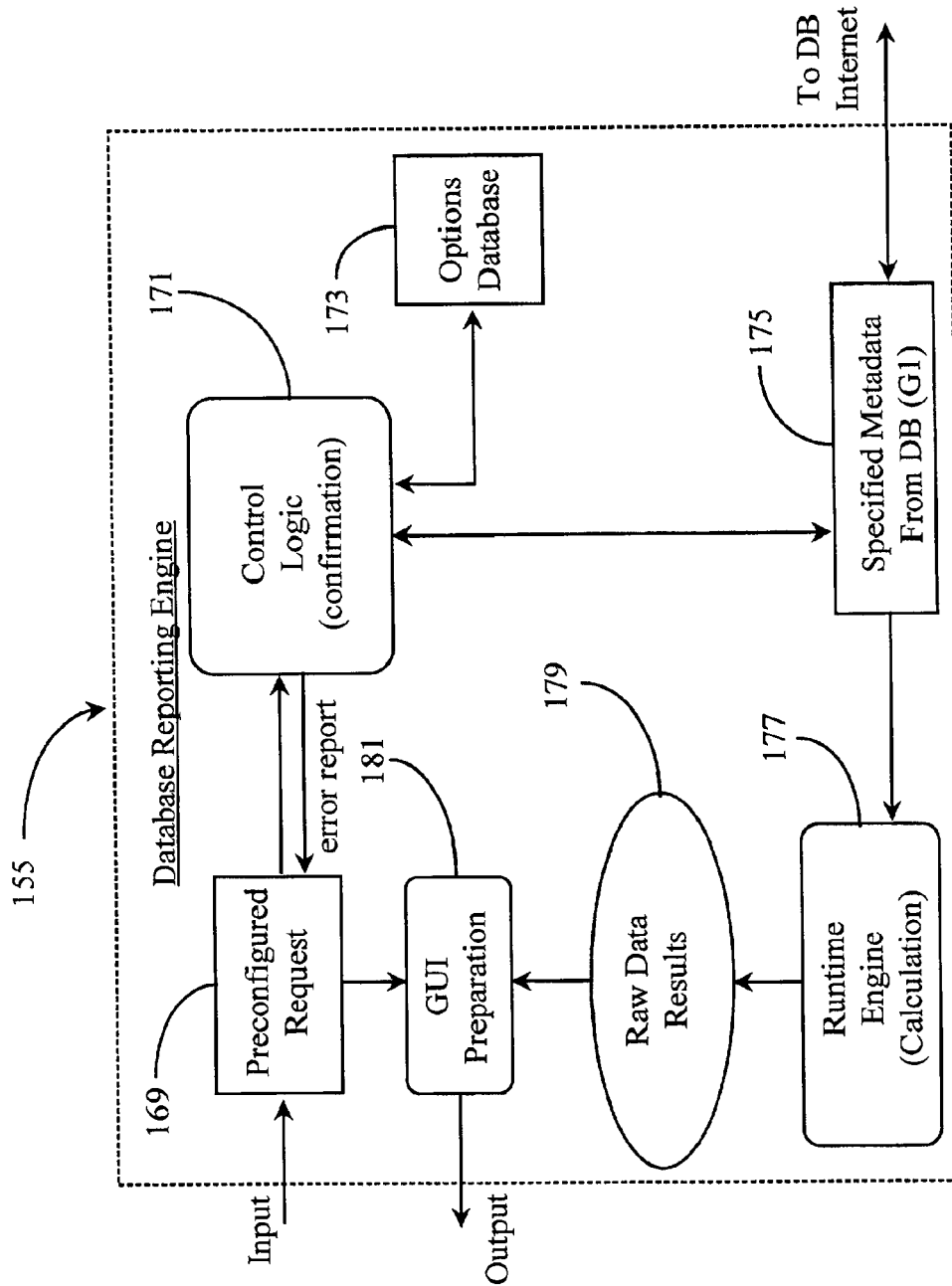
FIG. 8 is a block diagram illustrating components and functions of the database-reporting engine of FIG. 7 according to an embodiment of the present invention.

FIG. 8 is a block diagram illustrating additional detail, components and functions of DBRE 155 of FIG. 7 according to an embodiment of the present invention. DBRE 155 is a functional interface capable of obtaining, analyzing, and preparing data for presentation to a user. As such, it contains certain sub-modules responsible for performing certain required functions. For example, a control-logic module 171 is provided as part of DBRE 155 and adapted to parse and confirm a user's request as well as to insure that a user-selected presentation format is available and appropriate for the type of data result requested by a user. Such options are contained in an options database 173 illustrated as connected to control module 171 by a double arrow representing bi-directional communication.

Options database 173 may be part of DBRE 155 as illustrated herein, or part of repository 157 and made accessible to DBRE 155. In the case of DBRE 155 maintaining its own databases such as options database 173, and a previously described database containing user histories across multiple accounts, then DBRE 155 would be resident in a machine having enough storage memory to hold all required data. Such a machine could be a processor/server. In another embodiment, all stored data is held in repository 157.

DBRE 155 also has a runtime engine 177, which performs data analyzing and calculation in order to form specific data results or solutions for users based on user request. Engine 177 has access to all of the mathematical tools and system knowledge required to perform its objectives which can vary considerably. A knowledge base (not shown) may be used as a source of intelligence for engine 177 as is generally known in the art of configuration models.

Engine 177 performs a wide variety of mathematical functions including such as statistical analysis, summing, averaging, and so on. In one embodiment, algebraic, geometric, and trigonometric functions are also provided for performing more complex calculations. In most cases however, user requests will be geared more toward averaging, summing, predicting probabilities, deriving percentages, and so on. For example, summing multiple bank balances would be a common task. Analyzing on-line spending trends across multiple on-line shopping services would be another example of a common task. A more complicated report might compare shopping trends with income potential and produce a ratio figure along with recommended ways to improve on the ratio without sacrificing needed goods. There are many possibilities.

A graphics user interface (GUI) module 181 is provided within DBRE 155 and adapted to prepare data according to requested format and a requesting display type. GUI module 181 has knowledge of which presentation option was selected from options database 173, and knowledge of the parameters (hardware and software platform) of a particular device or station that will receive a report. It is not required that a report be directed back to an originating device. In some embodiments, a user may direct a meta-summary report to alternative receiving devices over different mediums. This assumes, of course, that the receiving devices and data networks are known to the system.

In practice of the present invention, a user initiates a request illustrated herein as an arrow labeled input to a pre-configured request 169 from such as his or her browser interface. Request 169 is parsed for meaning in control-logic module 171. If there is an error detected in the original request 169, such as missing information or an option selection that is not available, then an error report is immediately sent back to that user as illustrated by the arrow labeled error report. Control-logic module 171 may check options database 173 to determine if an unavailable option was selected and present an alternative available option back with the error report.

Once module 171 has confirmed a request and confirmed a presentation option, it accesses a guard (GI) 175 resident on the client side of such as repository 157 of FIG. 7 to see if there is enough current data stored therein to enable formulation of a valid result. Data obtained from repository 157 of FIG. 1 by way of database interaction is included in guard 175 and passed to engine 177 for processing. If however, a required portion of data is missing from repository 155, GSS 159 of FIG. 7 may be invoked to retrieve the requested data. An error message may, in this case, be sent back to a user informing him of a requirement to navigate for a portion of required data.

All of the data required to return a requested report is funneled into runtime engine 177. All of the appropriate calculations are performed and the resulting data illustrated herein as raw data-results 177 is passed into GUI module 181. GUI module 181 then prepares the result data for presentation to a user illustrated herein as an arrow labeled output.

As described above, a report may be very simple or quite complex, including text and graphical elements as well. In one embodiment, all of the process steps performed on included data may be broken down and reported to a user along with a final result. Presentation options may include spreadsheets, graphs, text reports, pie charts, and so on.

In the example presented above, DBRE 155 is a multifunctional module that may be broken down into cooperating sub-modules. However, this is not required to practice the present invention. One with skill in the art will recognize that there are other orders of modules and distribution paths that may be utilized to accomplish the same function. For example, DBRE 155 (FIG. 7) may interface directly with GSS 159 (FIG. 7) instead of being enhanced for gathering from aggregated data. In this case GSS 159 would first check repository 157 before determining if navigation is required. In another embodiment navigation may be required by default to insure that all data in aggregation is current. There are many possibilities.

Figure 9:
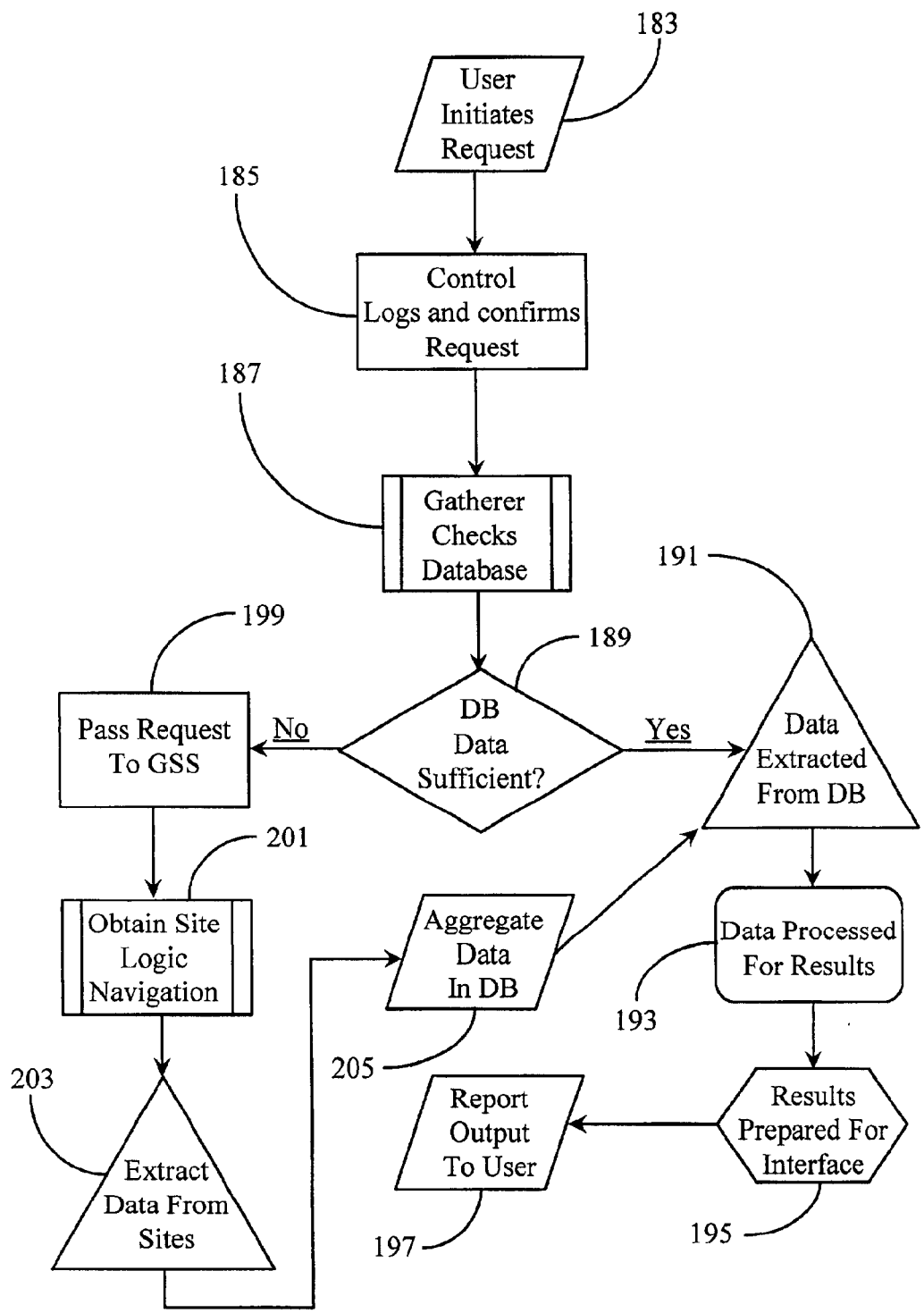
FIG. 9 is a process flow diagram illustrating logical user and system steps for initialization to completion of a meta-summarized report according to an embodiment of the present invention.

FIG. 9 is a process flow diagram illustrating logical user and system steps from initialization to completion of a meta-summarized report according to an embodiment of the present invention. At step 183, a user initiates a meta-summary report request from such as PC 163 of FIG. 7 using a browser/portal interface. A request might be to sum all of my interest earnings from all of my interest bearing accounts over a 1-year period and return a monthly average. In a preferred embodiment such a request may be made in a "natural language" understood by the portal software.

At step 185, control logic registers and confirms feasibility of the original request. This step includes parsing the request, confirming a presentation option, confirming presentation delivery parameters (software, hardware, medium) and so on. Once a request is approved for action, a data gatherer at step 187 accesses the database, such as in repository 157 (FIG. 7) for required data. Such a gatherer, termed a bot by the inventor, may be part of DBRE 155 as illustrated in FIG. 8, or part of GSS 159 of FIG. 7.

At step 189 it is determined whether or not there is sufficient data available in aggregation to complete the request. If the decision is yes, then the required data is extracted from the database (DB) in step 191. At step 193 the extracted data is processed according to tools that accomplish the user's request, which is a solution-orientated result. Text records of processing may also be forwarded to a user if requested. In this way a user might review several steps taken to arrive at a solution-oriented result.

At step 193, the raw result data is prepared according to user-requested presentation options in such as GUI module 181 of FIG. 8. A presentation option may consist of simple text results appearing on a user's portal home page. In one embodiment, a separate WEB page may be constructed that displays varied versions of the same result such as a time chart, a text paragraph explaining the chart, and a table reflecting result values. A meta-summary dealing with an averaged interest rate, as described in an example above, may be presented in a variety of ways. For example, each account and individual result may be listed, followed by a summed result over a particular time span, followed by an average figure over a smaller increment of time. There are no limits to presentation possibilities as long as the appropriate software containers are supported at both ends of the interaction. In most cases, a browser interface supporting full interactive function will be utilized. In step 197, the prepared GUI data is sent to a requesting user such as one operating PC 163 of FIG. 7 over an Internet connection such as connection 161. It should be noted here again that many devices are capable of effecting an interface with DBRE 155 of FIG. 8 and receiving result data. The success of configuring varied devices to the system will depend on provided network and data interfaces.

If in step 189 it is determined that there is not enough data or the right kind of data already in aggregation to complete a request, then the request is passed over to a GSS, such as GSS 159 of FIG. 7 in step 199. In one embodiment gathering is the sole responsibility of GSS 159 as has already been described. In step 201 site logic templates are obtained from such as a KW operating a PC such as PC 167 of FIG. 7. If the navigation templates required are the same as templates that have been previously used, then such templates may be obtained from a connected data store.

At step 203, a GSS such as GSS 159 of FIG. 8 navigates to and extracts data from required WEB sites in order to complete the aggregated data store on behalf of the requesting user. At step 205, the data is passed into aggregation in a database assigned for the purpose in such as repository 157. After all of the required data has been aggregated in step 205, steps 191 through 197 are repeated.

It will be apparent to one with skill in the art that the process steps described above represent a mostly automated or completely automated process. Moreover, there may be other sub-routines added without departing from the spirit and scope of the present invention such as adding a user notification step in the event that in step 189, data is insufficient.

It will also be apparent to one with skill in the art that a process routine such as the one described herein may be altered according to an alternate operating environment without departing from the spirit and scope of the present invention. For example, if a user is interfacing from a wireless device through such as a data center network interface, then added steps may be required to convert data to a format understood on a different network. There are many diverse applications.

Figure 10:
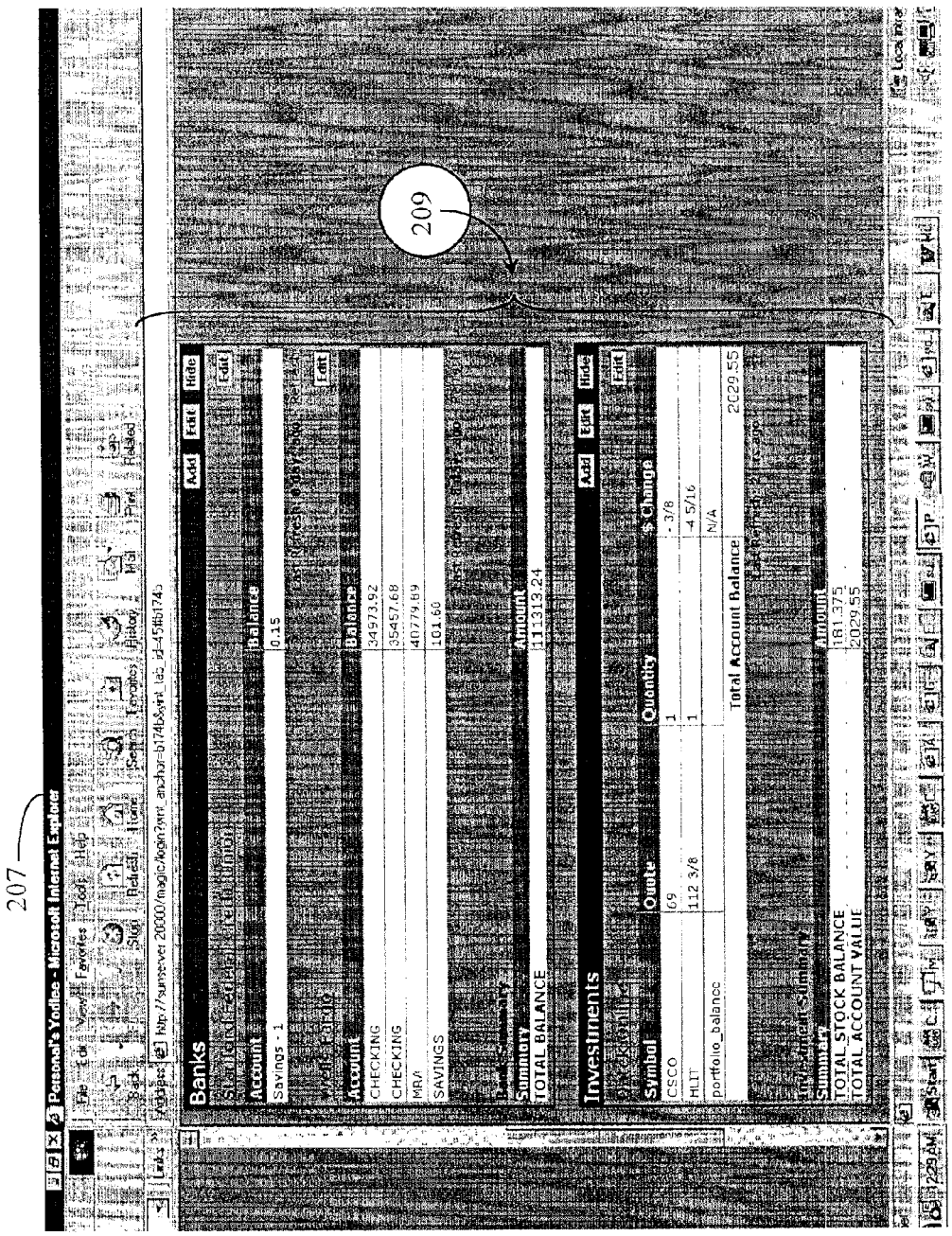
FIG. 10 is a representative view of an actual screen shot of a meta-summarized report on display in a user's browser interface according to an embodiment of the present invention.

FIG. 10 is a representative view of an actual screen shot 207 of a meta-summarized report 209 on display in a user's browser interface according to an embodiment of the present invention. In a more common implementation of the present invention, a user interfaces with such as a portal server by utilizing a common browser interface, many brands of which are known in the art and readily available. In this particular example, a Microsoft™ browser application known as the Internet Explorer™ (IE) is used. However the system of the present invention works with any software interface capable of navigating a data packet network.

Summary report 209 consists of individual bank, investment and account listings complete with the names of the institutions. Summaries of the individually reported information for both bank accounts and stock accounts are found beneath each group listing. Report 209 is a rather simplified example of many graphical possibilities and presentation methods. Depending on the complexity of a request, a meta-summarized report may contain virtually any type of presentation mediums. Some examples include, but the invention is not limited to limited to, Gant charts, time graphs, pie charts, flow charts, text summaries, and so on. In another embodiment, a summarized report may contain interactive options for looking at the same data in different ways, or even calculating further results from the results presented. A user has many options when accomplishing interface with the system of the present invention through a fully functional browser application installed on a powerful PC. Interface through other devices such as personal digital assistant's, cellular telephones, and the like will obviously limit presentation options, however, the use of such devices for interface is possible and may, in some situations, be preferred. Such situations may be business meetings, interviews, and other situations wherein a user may need to access some summary data, but does not have access to his personal computer station. Moreover, such data may be previously ordered and sent to a place other than at his or her personal computer. With appropriate interface to telephony networks, such information may, if directed by a user, be faxed to a meeting place, e-mailed to an associate's e-mail address, and so on. There are many diverse applications, many of which have already been stated.

Multiple Point-Of-Access Summary Interface

According to a preferred embodiment of the present invention, an interactive software interface suite is provided and packaged to enable multi-point access to deeper levels of summary data as well as transaction and direct account access capabilities.

Figure 11:
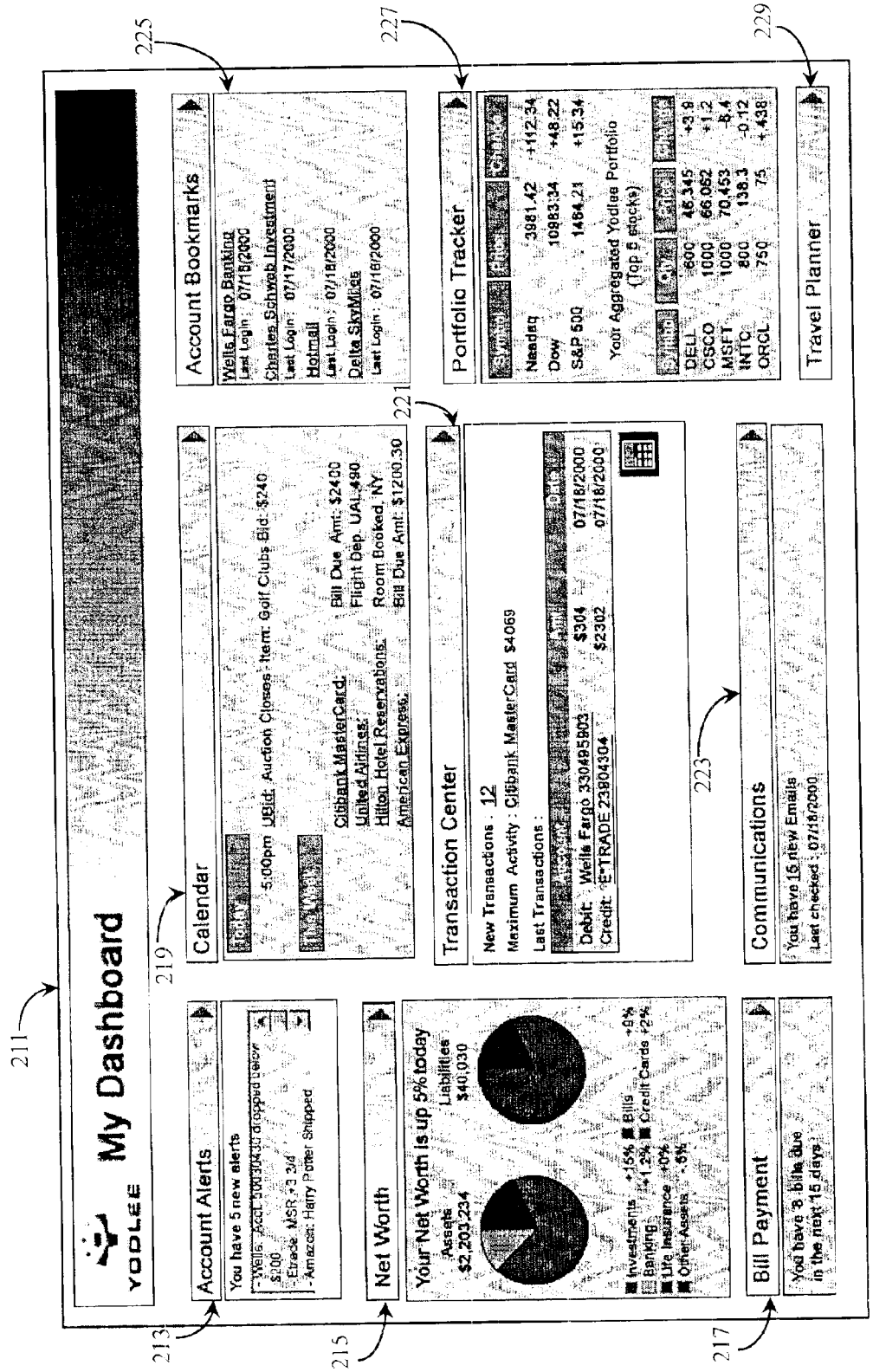
FIG. 11 is an exemplary screen shot of an interactive interface suite for enabling multipoint account management capabilities according to an embodiment of the present invention.

FIG. 11 is an exemplary screen shot of interactive interface suite 211 for enabling multipoint account management capabilities according to an embodiment of the present invention. Interface suite 211, termed a Dashboard by the inventors, provides a single interactive center for viewing summary data and for performing various transaction tasks related to data available through the interface. Interface 211 is described as a suite because it is composed of a plurality of sub-interfaces categorized in general by the type of data and functionality available through interaction with them. The plurality of sub-interfaces forming interface 211 are, in this example, packaged in the form of a single dynamic Web page using hyper-text-markup-language (HTML).

Referring now to FIG. 10, interface 211 replaces interfaces 207 as a more functional, organized, and user-friendly interactive interface for receiving summary and solution-oriented data.

Referring now to FIG. 7, exemplary user 163 accesses services by interfacing with portal interface 153 via Internet access line 161. Interface 211 is adapted to be served to user 163 in the form of a Web page that his dynamic nature meaning that it is continually updated with new information. Referring now to FIG. 8, database reporting-engine 155 provides the data preparation and calculative services necessary for enabling the enhanced display capabilities of interface 211 and related sub-interfaces.

In this example, interface 211 is made up of 9 sub-modules each module providing a different class of functionality. An Account Alerts module 213 is provided within interface 211 and adapted to display various types of user-configured alerts that may be applied to a wide range of user account types. A Net Worth module 215 is provided within interface 211 and adapted to report a user's net worth information as determined through calculation related to data associated with all of the user's financially related accounts, assets, and financial activities. Module 215 is illustrated in this example as presenting dynamic graphics in the form of pie charts describing a user's current assets and liabilities.

A bill Payment module 217 is provided within interface 211 and adapted for user configuration to report parameters related to bill payment. A Calendar module 219 is provided with interface 211 and adapted to hold all of a user's pending data-sensitive information. A Transaction Center module 221 is provided within interface 211 and adapted to list and summarize all of a user's online and manually input transactions. A Communications module 223 is provided within interface 211 and adapted to report parameters associated with a user's online communications applications.

An Account Bookmarks module 225 is provided within interface 211 and adapted to list all of a user's Web services in the form of hyperlinks, which are enhanced with automatic login functionality (known to inventor). A Portfolio Tracker module 227 is provided within interface 211 and adapted to follow and report parameters related to the user's favorite stocks and other investment vehicles. A Travel Planning module 229 is provided within interface 211 and adapted to enable a user to initiate, create, and manage travel itineraries including all parameters related to ticket purchase, hotel accommodations, car rentals, and other related tasks.

All of sub-modules 213–229 are interactive in the sense that a user invokes each module in order to obtain more detailed information regarding the types and classes of dynamic data handled by the invoked module. Therefore, data visible on the "face" of each module represents initial summarized updates that are exploitable for further details.

In one embodiment, further interactive enhancement is included in sub-modules 213–229 that list service providers maintaining accounts for users. From within these modules, the actual login service pages of those entities are accessible through provision of the appropriate hyperlinks to those pages. In addition to providing direct access to a user's service-providing entities through modules 213–229, hyperlinks to one or more configuration utilities associated with one or more modules servicing a particular class or type of data may also be provided. Another enhancement provided by interface 211 is that various sub-modules exemplified herein are interlinked with each other through database reporting engine 155 of FIG. 8 such that they may share overlapping data and cooperate with each other in prioritized or other fashions with regard to the presentation and reporting of data that may be associated or linked to more than one of the individual modules.

Referring now back to FIG. 8, data input leading into request module 169 of database reporting engine 155 may contain configuration input and request data from one or more utilities (not shown) that may, in preferred embodiments, be accessible through interface 211 of FIG. 11. Output from GUI preparation module 181 is channeled for display into the proper sub-module or modules ordering the data. Any particular display characteristics provided as options are stored in options database 173 and the products of user pre-configuration.

Referring now back to FIG. 11, Account Alert module 213 informs a user upon initial display of interface 211 of, in this case, 5 new alerts related to various types of accounts. For example, a listed Wells Fargo™ balance is shown to have dropped below a $200.00 balance threshold. Another listed alert informs a user that a Harry Potter© book ordered from Amazon™ has shipped. Alerts module 213 may be pre-configured to provide virtually any type of time or event-sensitive alert that a user may desire. By clicking on any of the listed alerts, a user may be hyper-linked to the appropriate sub-module responsible for the detailed data and account entity associated with the alert.

Net Worth module 215 uses the calculative and logic functions provided by database reporting engine 155 of FIG. 8 to present a periodic report summary of a user's current net worth. In this example, both assets and liabilities are graphically illustrated and color-coded to individual categories of assets or liability. It is important to note herein, that data results presented in module 215 may be derived from virtually every online account accessible to a user through interface 211. In one embodiment, the color-coded categories are interactive such that by clicking on them as hyperlinks sends a user to an appropriate sub-module wherein more detailed information is provided. Also in this embodiment, by clicking on one of the graphics, a pop-up display containing detailed report figures may be displayed. It is also noted herein, that all of the listed sub-modules 213–229 have interactive navigation arrows installed on their faces, the arrows providing navigation to more detailed levels of data which are displayed in secondary interfaces associated with the main module invoked. More detail regarding Net Worth module 215 is provided later in this specification.

Bill Payment module 217 informs a user, in this example, that he or she currently has 8 bills due within the next 15 days. By clicking on the provided navigation arrow, a more detailed account listing each bill by entity and account number and due date may be presented in a secondary interface associated with module 217. In this aspect, it is noted that the payment module 217 is interlinked with Calendar module 219 and may share overlapping data.

Calendar module 219 provides first, a summary of items to occur on the day accessed and items related to calendar events within the current running week. By clicking on the navigation arrow provided, a secondary interface is served containing a more detailed calendar display. More detail about Calendar module 219 will be provided later in this specification.

Transaction Center module 221 informs a user of new transactions occurring since the last time of access. In this case there are twelve new transactions noted. A maximum activity item is displayed on the face of Transaction Center module 221 and related to a particular account, in this case, a MasterCard™ account that has seen the most transaction activity during a pre-configured timeframe, or since the last time of access. Also shown on the face of Transaction Center module 221, is a section listing last transactions. In this action, there are two transactions listed. A debit transaction is listed including an account provider and account number, the amount of the transaction, and the date of the transaction. A credit transaction is listed that includes the same account, amount, and date parameters of the debit transaction. By clicking on the navigation arrow provided on the face of Transaction Center module 221, a user may navigate to a secondary interface providing additional detail. More detail about Transaction Center module 221 will be provided later in this specification.

Communications module 223 alerts a user, in this case, of a quantity of new e-mails. In this case, there are fifteen new e-mails listed. In one embodiment the fifteen e-mails listed may be generic to one e-mail account. In another embodiment, the fifteen e-mails listed may source from various accounts. By clicking on the navigation arrow on Communications module 223, a secondary interface will appear containing listed accounts. By clicking on one of the accounts listed, a user may invoke that particular e-mail interface and receive any associated e-mails through that interface. If only one e-mail account is configured to Communications module 223, then clicking on the navigation arrow will simply bring up that account software.

Account Bookmarks module 225 provides a list of URLs to a user's registered accounts along with a date listing the last time each account was accessed. By clicking on the navigation arrow provided on the face of Account Bookmarks module 225, a user may invoke the secondary interface containing a more detailed rendering of account data.

Portfolio Tracker module 227 provides a summary view of the latest activity regarding a user's chosen stock symbols. Module 227 also provides a current summary regarding the top five stocks, in this example, contained in a user's stock portfolio. By clicking on the navigation arrow provided on the face of Tracker module 227, a user may invoke the secondary interface rendering much more detail. Similarly, clicking on any of the listed stock symbols may invoke the secondary interface dedicated to that particular symbol, the interface containing much more information.

Travel Planner module 229 provides a tool for a user to invoke when it is desired to create travel plans. By clicking on the navigation arrow provided on the face of the interface, a user may invoke a secondary interface containing a configuration utility for ordering and submitting tasks related to purchasing airline tickets, booking a hotel room, arranging a car rental, and any other travel related tasks. It is noted herein, that secondary interfaces associated with the above-described modules are, in many embodiments, utilities wherein a user may create and submit requests for task performance related to the class of data covered by a particular module. In a preferred embodiment, such utility tools enable proxy performance of online tasks. Still, hyperlinks to actual web sites may also be provided such that a user may navigate to and manually perform a task at the actual site invoked.

It will be apparent to one with skill in the art that interface 211 and associated modules 213–229 may be provided of a different look and feel as well as of differing content and data classification without departing from the spirit and scope of the present invention. The unique capability loaded into interface 211 of enabling performance of various proxy tasks, integrating solution-oriented data between more than one module of interface 211, and providing site-access to associated sites through multiple points of entry represents a level of novelty not known in current-art or prior-art interfaces. Furthermore, the unique proxy capabilities performed by the data compilation, aggregation, and summary system, known to the inventor, are fully accessible through interface 211 providing a level of user-friendliness heretofore not known in the art.

FIG. 12 is an exemplary screen shot of a secondary interface 231 invoked as a result of user interaction with module 219 of FIG. 11 according to an embodiment of the present invention. Secondary interface 23 is a detailed calendar utility accessible by invoking Calendar module 219 described in FIG. 11 above. Interface 231 is interactive according to a variety of provided options.

A resolution toolbar 235 is provided within interface 231 and adapted to enable a user to view various calendar resolutions of day, week, month, and year. In this example, interface 231 is displaying data associated with a particular calendar week (Jul. 18–24, 2000) as indicated.

A time-sensitive calendar bookmark window 237 is provided within interface 231 and adapted to show the current day of the current month of the current year. An interactive ad button 239 is provided within interface 231 and adapted to enable a user to enter a new calendar item such as an appointment, task, or other pending item. By invoking ad button 239, an interactive utility (not shown) for making calendar additions appears. Such utility contains all of the required fields and dialog options necessary for making correct calendar additions for later display within interface 231.

A show-item option window 241 is provided within interface 231 and adapted to enable a user to select specific categories of calendar entries to view within interface 231. In this example, the categories auctions, shopping, travel, bills, banking, credit cards, and investments are listed within window 241. The only category not selected for view is the category of banking. Therefore, existing calendar entries for the remaining categories, which are selected, appear as visible within interface 231. It is noted herein that calendar items pertaining to all selected categories within window 241 are restricted to items pending within the week of Jul. 18–24, 2000 as ordered by the options selected in resolution toolbar 235.

A summary view section 233 is provided within interface 231 and details actual pending calendar items existing within the time frame of Jul. 18–24, 2000 as ordered by window 241 and toolbar 235. In this example, the summary view lists the time and day of each pending item along with a summary description of each item. It is noted herein that titles of entities associated to each pending item listed in section 233 are interactive in that by clicking on them, further detail about the pending item is displayed.

Calendar interface 231, in a preferred embodiment, is cross-linked with other modules such that data incorporated therein may be affected by actions performed in other modules. For example, if a user pays a bill through the payment module 217 of FIG. 11, and that particular bill was listed as a pending calendar item within interface 231, then the action of paying the bill through module 217 results in automatic deletion of the appropriate item entry in interface 231. Such interoperability is achieved through background application-program-interfacing (API) with database reporting engine 155 of FIG. 8.

Figure 13:
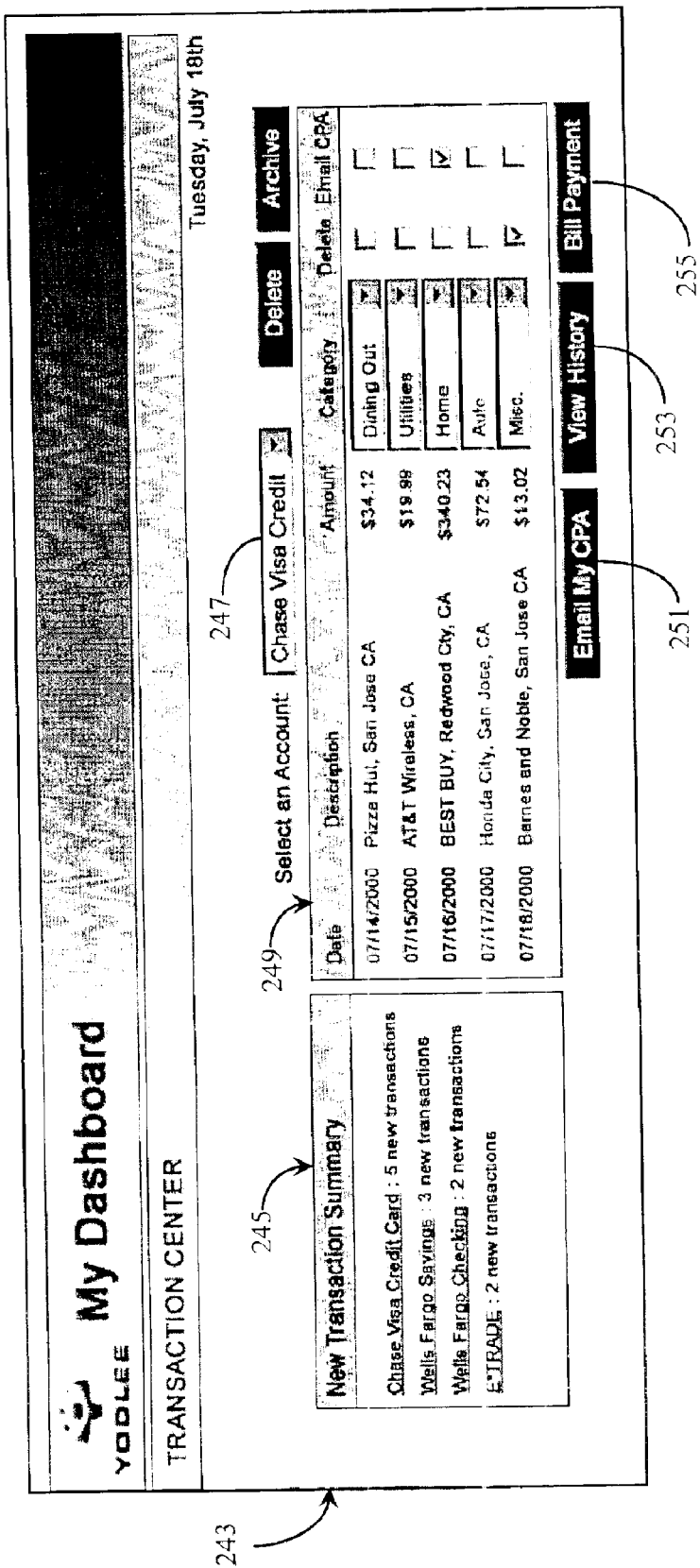
FIG. 13 is an exemplary screen shot of a secondary interface resulting from invocation of transaction center module 221 of FIG. 11 according to an embodiment of the present invention.

FIG. 13 is an exemplary screen shot of a secondary interface 243 resulting from invocation of Transaction Center module 221 of FIG. 11 according to an embodiment of the present invention. Interface 243 is an interactive interface providing a more detailed summary view of transaction data associated with a user's registered accounts. Interface 243 may be thought of as an interactive utility that enables a user to categorize all online transactions as well as off-line transactions into a simple user interface. Interface 243 is both a summary reporting tool and a transaction entry utility.

It is noted herein that interface 243 is provided in the form of an HTML interface. In this example, all of the described interfaces are displayed as HTML interfaces. However, this is not specifically required in order to practice the present invention. Interface 211 of FIG. 11 and all associated interface modules and secondary interfaces may be provided using other markup languages and programming techniques. Furthermore, much tailoring may be provided in order to adapt such interfaces to display in accordance to rules and protocols of a variety of data-access devices. For example, scaled-down versions for devices that use web clipper applications and many browsers can be provided.

Referring now back to FIG. 13, New Transactions Summary window 245 is provided within secondary interface 243 and adapted to display quantities of new transactions categorized to associated accounts. New transactions are identified, in this example, as any new transactions that have occurred since the last time of update or sense the last time of user access of interface 243. There are four accounts listed by title with each account associated with the specific quantity of associated new transactions discovered.

A scroll-down menu 247 is provided within secondary interface 243 and adapted to list all of the user's registered accounts in an interactive fashion such that selecting one of the items contained in menu 247 invokes a transaction history report exemplified herein by a history window 249. Therefore, in this example there are five transactions associated with the selected account (Chase™ Visa™ Credit). In this example, the five detailed account transactions listed in window 249 by the five new transactions reported for the same account in window 245. It will be apparent to one with skill in the art that there may be more registered accounts listed in menu 247 than are shown in summary window 245 without departing from the spirit and scope of the present invention. In this example, window 249 simply details new transactions reported in window 245.

The above-described detail of the new transactions listed in window 249 includes date, description, amount of transaction, and category. A user using a scroll-down category menu containing a list of category options may assign category detail associated with any transaction. In this way, transactions may be uniformly categorized for tax and other organizational purposes. Action items are also reported within history window 249 such as for deleting a transaction and for notification that an e-mail regarding a specific transaction was sent to a certified-public-accountant (CPA) for tax or other accounting purposes.

Other interactive options provided within secondary interface 243 include a manual delete option for manually deleting a transaction, and an archive access option for accessing archived transaction lists. Still other options include CPA-notification option 251, a view-history option 253, and a bill-payment option 255. Bill payment option 255 interlinks with bill-payment module 217 of FIG. 117 which is a utility in enabling a user to perform online bill payment.

It will be apparent to one with skill in the art that interface 243 may be provided of a different look, feel and function than that which is illustrated herein without departing from the spirit and scope of the present invention. For example, Summary window 245 may be adapted simply to provide a pre-configured amount of latest transactions without regard to system update or user access. Similarly, Summary window 245 may list all of a user's registered accounts and quantities of latest transactions instead of just those having new transactions discovered since a last update. Moreover, transactional histories may be organized and accessible according to account, transaction category, and the like.

Figure 14:
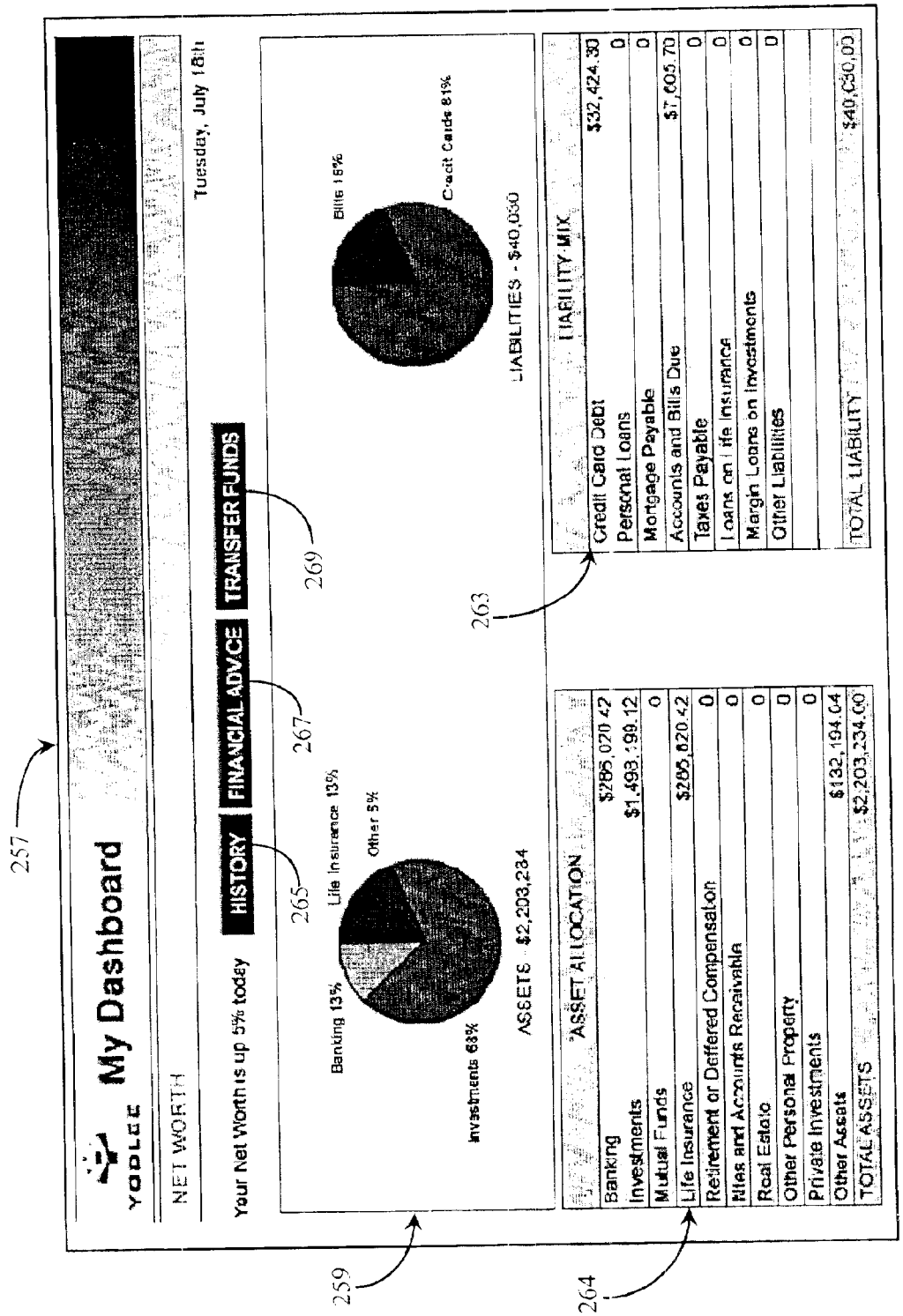
FIG. 14 is an exemplary screen shot of a secondary interface resulting from invocation of network module 215 of FIG. 11.

FIG. 14 is an exemplary screen shot of a secondary interface 257 resulting from invocation of Net Worth module 215 of FIG. 11. Interface 257 provides a more detailed view of a net worth report summarized with graphic pie charts on the face of module 215 of FIG. 11. In this view, the graphic pie charts of module 215 are visible within a provided graphics window 259. Window 259 represents a display option such as was described with reference to FIG. 8 and options a database 173. Other types of graphical representation may be utilized other than the pie charts exemplified herein. In this example, in addition to the pie charts and associated total figures, which are also represented on the face of module 215 as a summary view, actual percentages of data making up the charts are included. An Asset-Allocation window 264 is provided within interface 257 and adapted to list all of the data categories associated with asset computation and their respective totals. A Liability Mix window 263 is provided within interface 257 and adapted to list all of a user's personal financial liabilities considered in assessing a total liability. As can be seen in this example, Windows 264 and 263 are simply report mechanisms reflecting more detail associated with the graphic representation illustrated in window 259.

Net Worth interface 257 is a unique reporting vehicle that is able to provide a user with up-to-date renditions of that user's current net worth. Such a tool enables a user to modify his or her transactional behavior so as to benefit his or her total Net Worth. An interactive History button 265 is provided within interface 257 and adapted to enable a user to view net worth history over a span of time. Such a history report may be presented in the form of a graph indicating value on one axis and time on the other axis.

An interactive Financial Advice button 267 is provided within interface 257 and adapted to enable a user to obtain financial advice in the form of system recommendations and/or advice from a live financial consultant having access to the user's portfolio and transactional data. An interactive Transfer Funds button 269 is provided within interface 257 and adapted as a utility in enabling the user to engage in funds transfer activity associated with registered accounts. It is noted herein that funds transfer activities initiated from invocation of button 269 are assumed to be tasks that are performed by proxy. Although it is not illustrated in this example, invocation of Transfer Funds button 269 provides an additional interface (not shown) that will contain all of the necessary dialogue fields for facilitating transfer of monies from one account to another. In one embodiment of the present invention invocation of Transfer Funds button 269 provides a list of accounts in the form of URLs. By clicking on these, a user may access those sites and perform manual transfer activities if so desired.

In one embodiment of the present invention, Net Worth module 215 of FIG. 11 is cross-linked with other related modules such that active bill paying, online purchasing, and payment on loans is automatically incorporated into computations for net worth reporting. As was described above, solution-oriented results may be computed from and reported to a variety of the modules described in FIG. 11.

Figure 15:
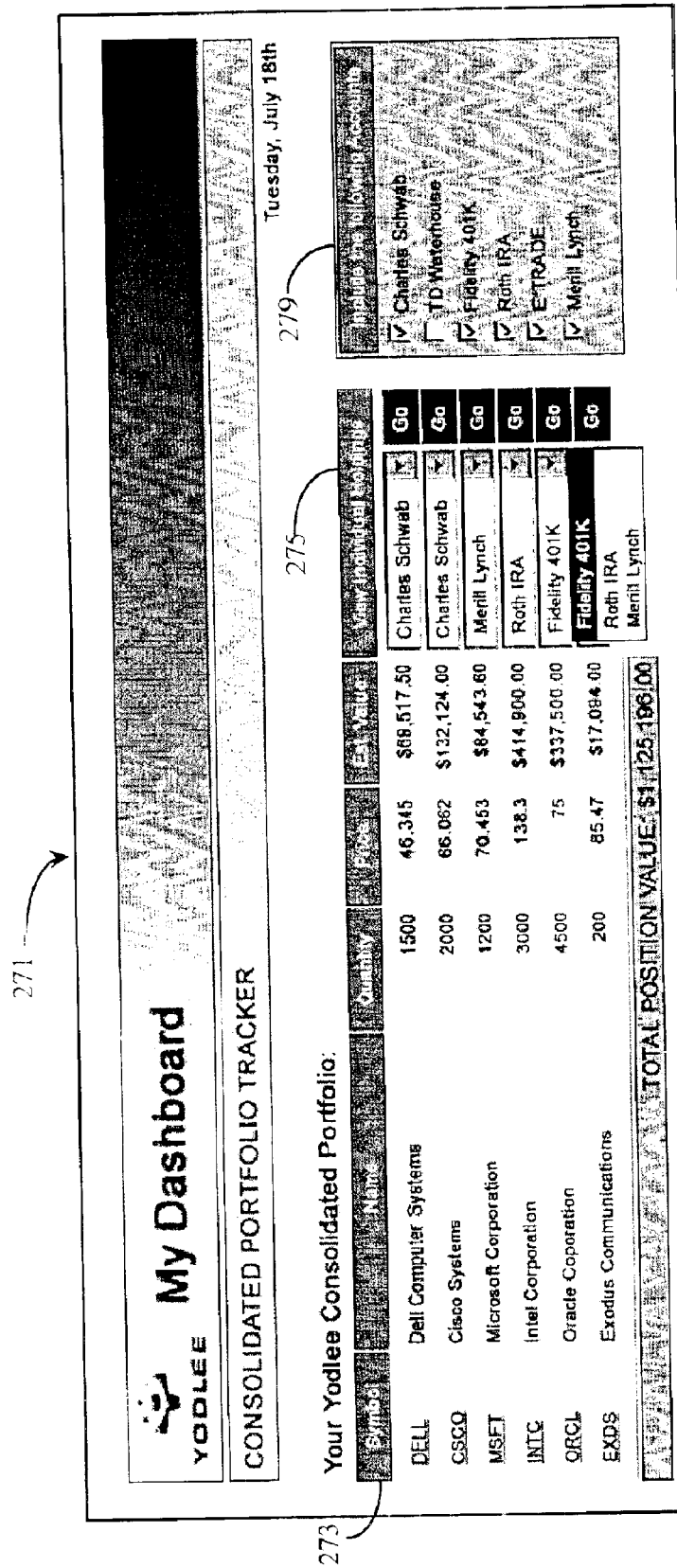
FIG. 15 is an exemplary screen shot of a portfolio tracker interface resulting from invocation of portfolio tracker module 227 of FIG. 11.

FIG. 15 is an exemplary screen shot of a Portfolio Tracker window 271 resulting from invocation of Portfolio Tracker module 227 of FIG. 11. Interface 271 provides a more detailed rendition of the summary information reported on the face of module 227 of FIG. 11. A consolidated portfolio listing 273 is provided within interface 271 and consists of a user's stock symbols, company names, quantities of shares owned, price of individual shares, and estimated value total for each company. In this example, a solution-oriented result reflecting a summation of all of the estimated values of all of the owned stock is provided as a total position value.

An individual-holdings window 275 is provided within interface 271 and adapted to enable a user to view individual stock or investment holdings and also to navigate to actual sites maintaining the accounts as illustrated by the plurality of go buttons representing URLs. An options window 279 is provided within interface 271 and adapted to enable a user to choose only the data that he or she desires to track and view.

It will be apparent to one with skill in the art that interface 211 as illustrated and described in this specification provides all of the mechanisms for ordering, viewing, and manipulating all aspects of online, and some cases off-line user data through a single user interface accessible from an Internet-capable appliance. Data accessible through interface 211 is, in one embodiment, updated each time a user of the interface logs in. In another embodiment, data accessible through interface 211 is updated, in addition, by request termed a refresh action in the art. In still other embodiments, portions of the data accessible through interface 211 are updated by demand while other portions may be updated periodically. Still other portions of data accessible through interface 211 are continually updated in real-time. There are many possibilities.

It will also be apparent to one with skill in the art that interface 211 and functional modules provided therein or accessed thereby may be interfaced to a database reporting engine such as engine 155 of FIG. 8 by, for example, API methods, or to equivalent software functioning as database software resident on a machine having access to users aggregated data.

Interactive Transaction Center Interface

According to a preferred embodiment of the present invention, an interactive transaction center interface suite is provided and packaged to enable access to a multiplicity of data sources to provide detailed information, transaction capabilities, and direct account access capabilities.

Figure 16:
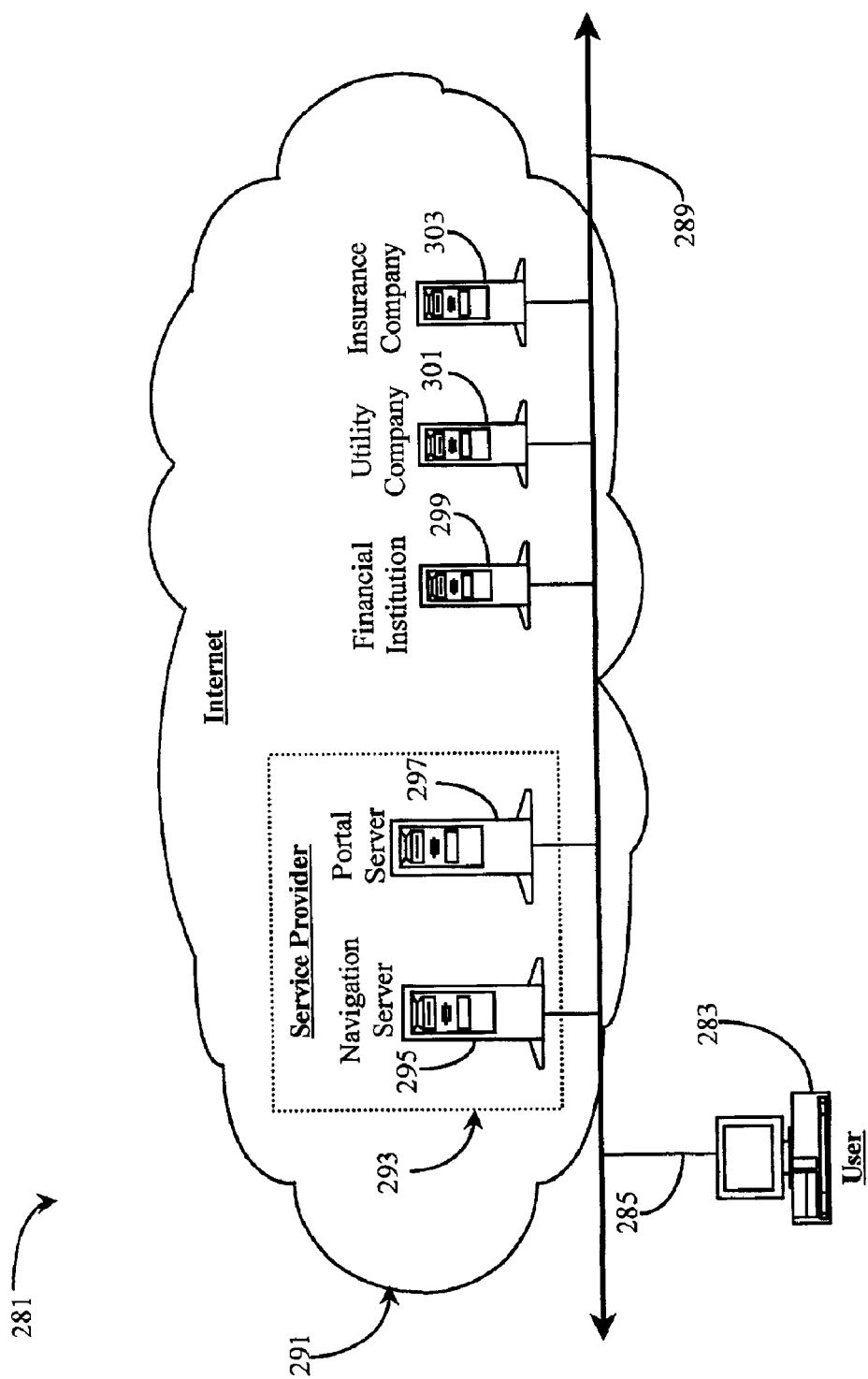
FIG. 16 is an overview of a communications network wherein an Internet portal system is practiced according to an embodiment of the present invention

FIG. 16 is an overview of a communications network 281 wherein an Internet portal system is practiced according to an embodiment of the present invention. This portal system, exemplified by specific equipment groupings and connection capabilities, is somewhat analogous to the communications network practicing an Internet portal system as described in FIG. 1 of Ser. No. 09/208,740 referenced above in terms of basic architecture and software implementation.

Communications network 281 comprises basically an exemplary user, illustrated herein as operating a PC 283, an Internet access line 285, which connects user 283 to an illustrated Internet backbone 289, which is illustrated as extending through the well-known Internet network 291 represented in this embodiment as a cloud diagram 291. Further description will refer to user 283. Communications network 281, in this embodiment, supports an Internet-service-provider (ISP not shown) in addition to a unique network-portal capability, which will be described further below.

User 283 is illustrated as a PC icon in this example, however in some embodiments, user 283 may access the portal system by means of any Internet-capable device having a means for Internet access and display capabilities.

Internet access line 285 may be a normal telephone line, an integrated-services-digital-network (ISDN) line, a digital subscriber line (DSL) or other well-known connection mediums including wireless mediums. An ISP access architecture is described as a preferred means of Internet access solely because of its commonality in the art. A public-switched-telephony-network (PSTN) may be assumed to be the network through which user 283 accesses backbone 289. Backbone 289 represents all of the lines, equipment, and connection points making up the Internet network as a whole. Therefore, there are no geographic limits to the practice of the present invention.

A service provider 293 is illustrated within Internet cloud 291. Service provider 293 in this embodiment comprises a navigation server 295 and a portal server 297. Service provider 293 represents an entity providing data procurement, aggregation, and summary services of personal on-line data subscribed to by users. User 283, in this example, represents one such user subscribing to services provided through service provider 293.

Navigation server 295 is a unique information-source navigation server adapted for the purpose of navigation to particular and/or designated destinations on behalf of users. Portal server 297 hosts a unique subscription service as an Internet portal through which users may order a wider variety of data procurement aggregation and summary services. Portal server 297 maintains all necessary passwords, user names, and user profile data for the purpose of enabling proxy services. Therefore, a data repository for storing such information may be assumed to be present as was exemplified in FIG. 7 above regarding data repository 157. Moreover, portal server 297 is analogous to the portal interface 153 of FIG. 7. Navigation server 295 may be assumed to be analogous to the gathering subsystem (GSS) 159 of FIG. 7.

Network 291, in addition to comprising service provider 293, also comprises a plurality of file servers located outside of the domain of provider 293. These servers are exemplified as a financial institution server 299, a utility company server 301, and an insurance company server 303. Servers 299–303 represent customer access points within Internet 291 through which user 283 may access services. For example, user 283 may have one or more financial accounts accessible through server 299. User 283 may have an on-line utility account maintained by server 301. User 283 may be assumed to have one or more insurance policies accessible through server 303. It should be noted herein, that the examples cited immediately above do not in any way limit the type, location, or number of information sources that are available to be accessed within the scope of the present invention as practiced on the internet. Internet network 291 is representative of a preferred use of the present invention, but should not be considered limiting, as the invention could apply in other types of networks and combinations of networks.

As taught by disclosure and example with reference to the applications listed in the cross-reference section of the specification, user 283 may access Internet 291 by way to access line 285 and backbone 289 and then engage in a data session with portal server 297 for the purpose of ordering a wide variety of tasks to be performed with respect to his or her personal data available in servers 299–303. Portal server 297 in cooperation with navigation server 295 enables user 283 to manage various aspects of his or her personal data held in servers 299–303 without requiring user 283 to physically navigate to servers 299–303. The unique software suite described in the background section may be assumed in this example to be installed on portal server 297 and available to user 283 upon connection thereto. By virtue of the described enhancement including interactive interface capability, a wide array of data management and task performance possibilities exist.

This specification focuses on a modular portion of the above described software suite termed a transaction center interface by the inventor. Therefore it may be assumed in this example that the above-described software suite, more specifically the transaction center module of that suite is displayed in the form of a personalized user interface on the device employed by user 283 to access portal server 297, which in this case is a PC. More detail regarding the innovative function of the transaction center module of the present invention is provided below.

Figure 17:
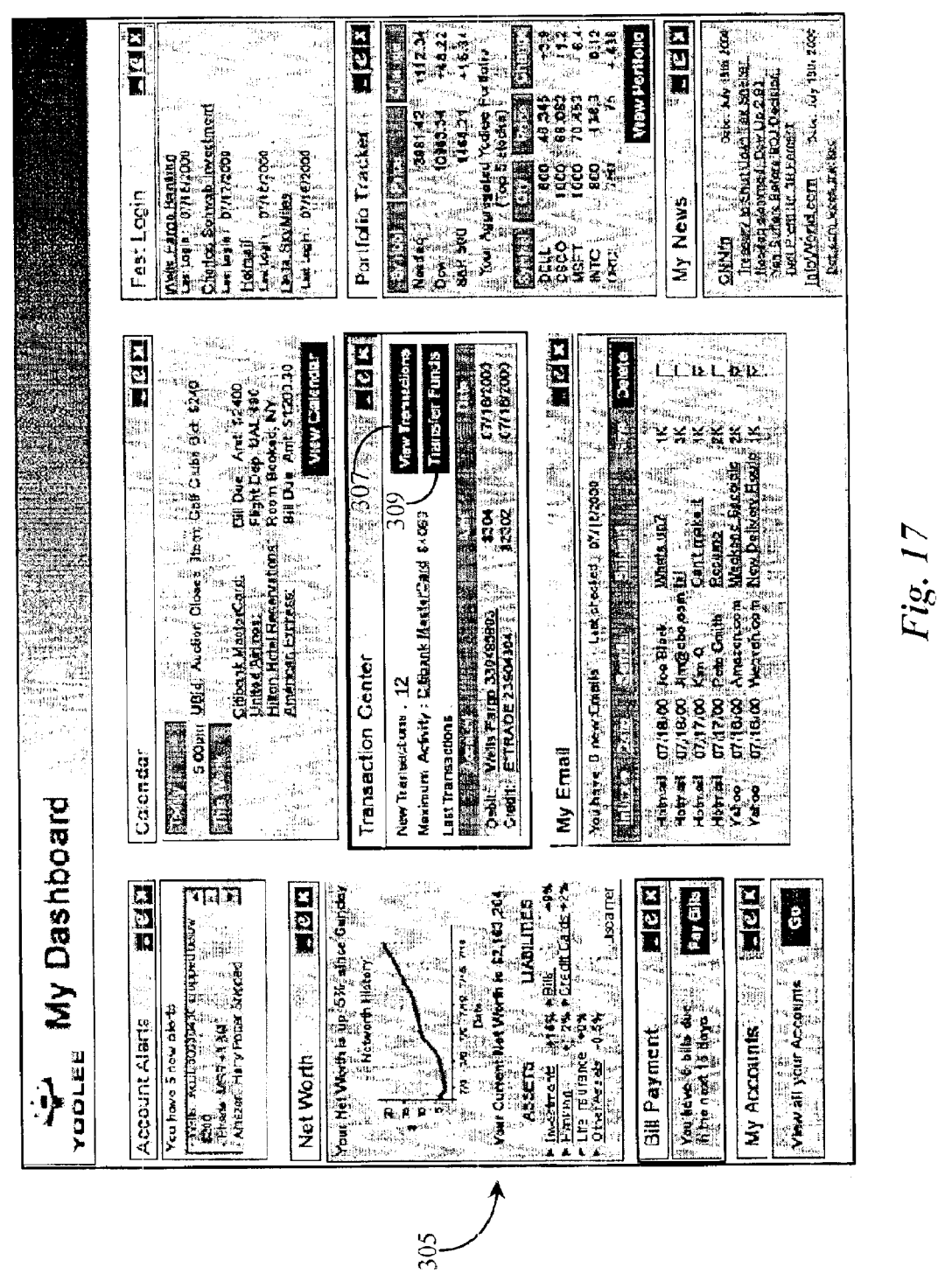

FIG. 17 is an exemplary screen shot of a personalized interactive interface suite 305 including a transaction center module 306 according to embodiment of the present invention. Interface suite 305 is analogous to the interface suite 211 illustrated in FIG. 11 above. Transaction center module 306 is analogous to the module 211 in the same figure. Transaction module 306 is adapted to enable proxy collection and display of a multiplicity of subjects and for enabling multi-point transactions of personal accounts according to embodiments of the present invention.

Transaction module 306 has a text summary on its face as well as interactive icons, illustrated herein as a View Transactions icon 307 and a Transfer Funds icon 309. By interacting with icons 307 and 309, which are HTML links in this example, a multiplicity of sub-interfaces related specifically to activities and history of financial related on-line accounts held by the interacting user (283) may be accessed. In a preferred embodiment of the present invention, the main interface of transaction module 306 is presented in HTML. Similarly, secondary or sub-interfaces accessible through interaction with HTML links 307 and 309 are also HTML interfaces. However, the should not be construed as a limitation to the practice the present invention as other Web-based descriptor and markup languages may be provided with versions usable on varying types of access devices. The example of HTML simply serves as a standard operating protocol for example of access through an Internet-connected PC as is the case with user 283.

Transaction module 306 provides information obtained from destination sources related to the number and status of financial transactions performed by a user subscribing to the data. In this exemplary interface there are twelve new transactions noted as illustrated in a summary line item labeled New Transactions. A Maximum Activity notification is listed immediately under New Transactions, and indicates that a major credit card account that has been subjected to the most transaction activity during a preestablished timeframe or since the last time of update of the transaction center module.

A Last Transactions section is illustrated within module 306 and listed therein is a debit entry to a major banking institution and a credit entry to a on-line brokerage firm with the respective cash amounts and dates for those transactions. The text summaries illustrated on the face of module 306 are assumed in this example to be ordered by the requesting user through pre-configuration to display at time of log-in. It is noted herein that there may be many varying descriptions and orders of summary data appearing on the face of module 306.

In the present embodiment, module 306 has at least two embedded interactive links as previously described, these being View Transactions 307 and Transfer Funds 309. By interacting with View Transactions link 307 on the face of the Transactions Center module 306, a user may access more detailed information about any one or all transactions available for viewing. By interacting with Transfer Funds link 309 on the face of module 306, a user may engage in funds transfer activities associated with registered accounts. It is noted herein that funds transfer activities initiated from invocation of the Transfer Funds link are assumed to be tasks that are performed by proxy. Although it is not illustrated in this example, invocation of the Transfer Funds link provides an additional interface (not shown) that will contain all of the necessary dialogue fields for facilitating transfer of monies from one account to another. Similarly, a secondary interface appears upon invocation of link 307.

It will be apparent to one with skill in the art, that text summary information as well as embedded links 307 and 309 may vary in displayed location within module 306 without departing from the spirit and scope the present invention. It will also be apparent that there may be more interactive links and more categories of text summary configured to appear on the face of module 306 at time of log in without departing from the spirit and scope the present invention. For example, the user may configure additional summary information and categories as well as, perhaps, ordering one or more additional interactive links to be provided with the initial summary interface (module 306). In this regard, the real estate that module 306 commands with an interface suite 305 may vary accordingly.

Figure 18:
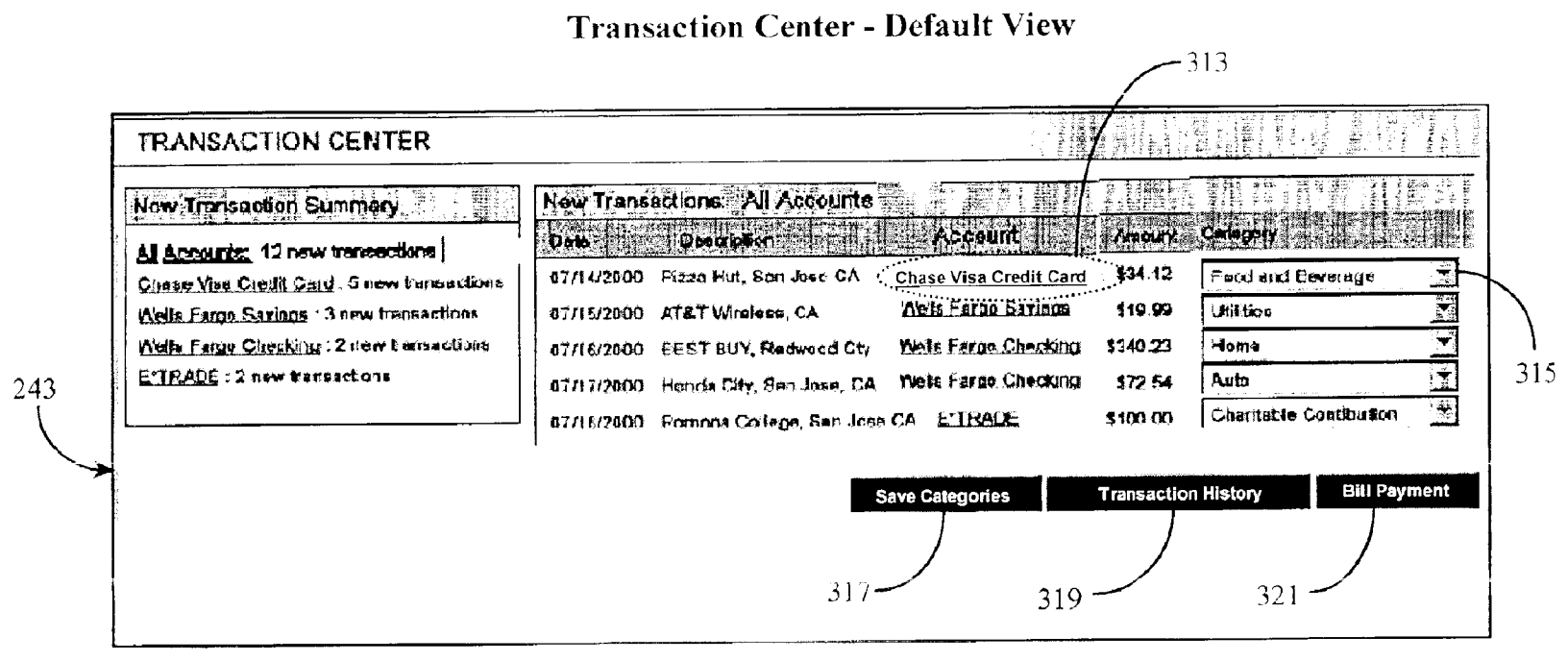

FIG. 18 is an exemplary screen shot of the Transaction Center caused to display through interaction with View Transactions button 307 of FIG. 17. Transaction center interface 243 represents a secondary interface providing a more detailed view of transactions as well as additional interactive options. In general, transaction center 243 enables a user to categorize completed credit card transactions, banking transactions, funds transfers, and person-to-person transactions, and potentially other transactions as well.

An accessing user can view and chart categorized transaction histories over user-specified time periods. In this example center 243 displays a default view illustrating a summary of new transactions (New Transaction Summary) and an all-accounts view of new transactions (New Transactions: All Accounts).

The New Transaction Summary window located furthest left within interface 243 simply provides a more detailed summary of the twelve transactions noted on the face of module 306 and FIG. 17. The New Transactions window located adjacent to the summary window and to the right provides individual line items having various data aspects presented in column form. Reading from left to right there is a column for the Date of each line item, a column for Description of each line item, a column specifying a debit Account for each line item, and a column specifying the Amount of each transaction.

An additional section is provided within interface 243 and labeled Category. This section comprises a plurality of drop-down menus listing a plurality of transactions category options. These default categories are intelligent, in that transactions are automatically categorized with an appropriate category as they occur and are entered under the appropriate category based on a user's prior categorization scheme. It is noted herein that a user may arbitrarily change a category associated with any line item by simply interacting with the drop-down menus such as menu 315, and selecting an alternate category. Where transactions cannot be categorized automatically, they are listed uncategorized in the default mode. Basic transaction categories may include, but will not necessarily be limited to, Uncategorized, Income, and Expenses. The income category may include, but will not necessarily be limited to: Salary, Bonuses, Dividends, Gifts, Interest income, Investment income, Other income, and Tax refunds. The expenses category may include, but will not necessarily be limited to: Auto, Bank, Cash, Charity, Clothing, Dining, Education, Entertainment, Gift, Groceries, Household, Insurance, Interest, IRA contribution, Medical, Miscellaneous, Recreation, Rent, Subscription, Taxes, Utility, and Vacation. By selecting one of the basic categories, transactions are sorted and displayed according to that category. By selecting one of the subcategories associated with the basic category, transactions are sorted and displayed according to that subcategory.

In the New Accounts Summary window there are indicated 12 new transactions having occurred on all accounts as previously described. Those accounts are listed below the 12 new transactions labeled and are noted as five new transactions on a major banking institute credit card, three new transactions on a major bank savings account, two new transactions on a checking account at that same major bank, and two new transactions with an on-line brokerage firm. The entries in the New Transactions Summary are interactive entries that upon interaction take the user to another view or secondary interface. For example, if a user clicks on one of the interactive accounts listed in New Transactions, all transactions specific to the selection are displayed and listed in chronological order with the newest transactions at the bottom of the list. The metamorphosis just described occurs within the new transactions window. Therefore, the new transactions window acts as a results interface capable of alternate displays according to user selection.

It is noted herein that "new transactions" are those transactions not yet viewed. Once a transaction has been viewed, it is moved to a Transaction History page (not shown) details of which are provided later in this specification. In the New Transactions: All Accounts window the individual transactions include the date, description, account, amount, and category of each individual transaction as previously described above. Transaction category display is tailored to the needs of a user through selection of one of the navigation arrows 315 for major groupings of subjects represented in this embodiment by Food and Beverage, Utilities, Home, Auto, and Charitable Organizations.

There are three functional links displayed on the face of interface 243. A Save Categories function 317 allows a user to select categories related to specific accounts and save them to be accessed as new transactions occur. In one embodiment, a user may specifically create categories for certain types of transactions. When new transactions occur, they are automatically categorized according to user preference. In a preferred embodiment however, most transactions can be associated by default with one of the plurality of default categories available.

A transaction history function 319 is provided within interface 243 and adapted to enable a user to gain access to a secondary interface, which provides an uncategorized detailed history of transactions. In this mode, the user also has the ability to view transactions in a multiplicity of combinations of accounts, timeframes, and categories. A bill payment function 321 is provided within interface 243 and adapted to enable a user to access the Bill Payment module depicted in FIG. 11 and in FIG. 17. It is noted herein, and has been previously described, that the individual account entries displayed on the face of the New Transactions: All Accounts window are interactive, such that by selecting any one of the individual accounts, a secondary interface is accessed that will display all transactions associated with the selected account.

Figure 19:
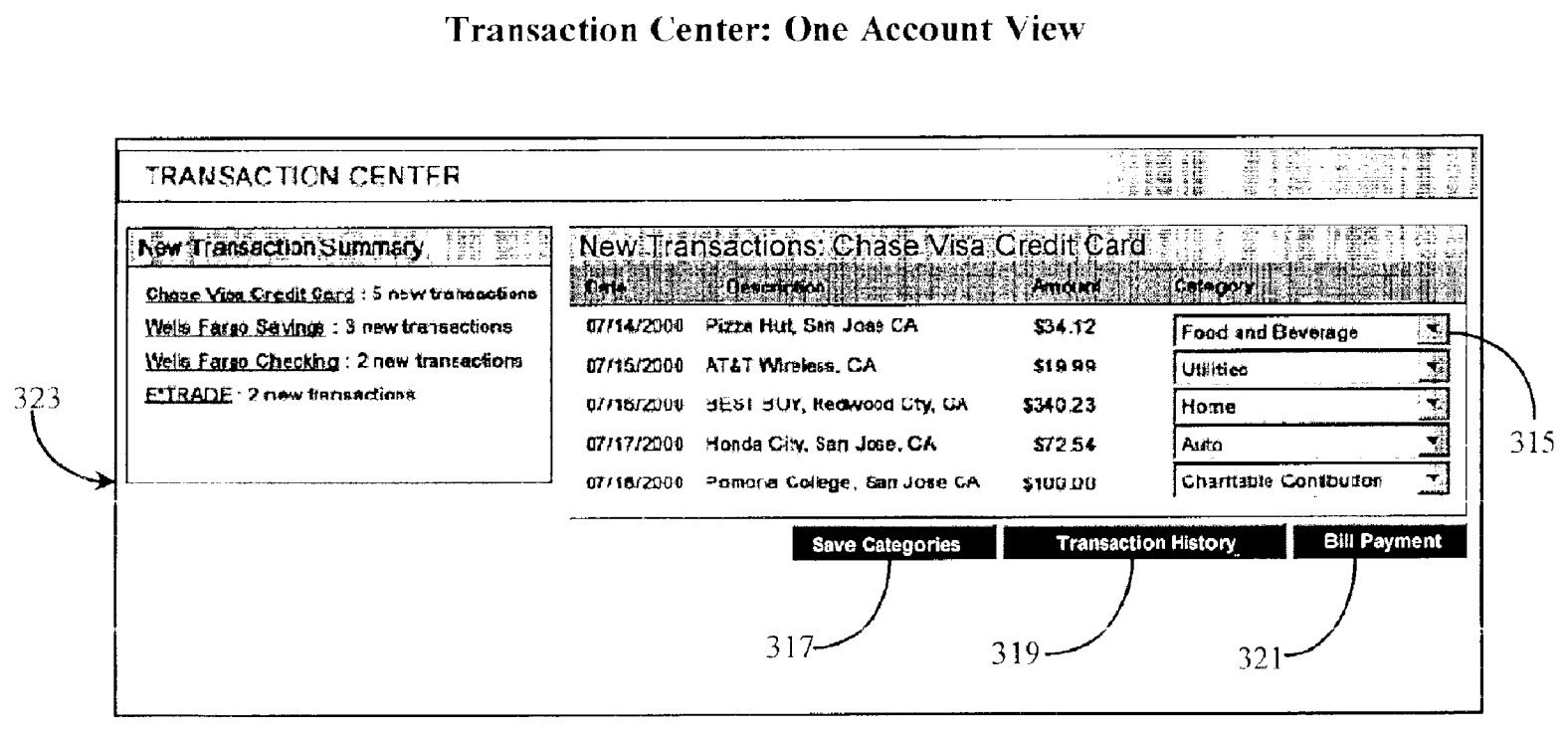

FIG. 19 is an exemplary screen shot of a Transaction Center: One Account View 323 which is reached by clicking on any one of the designated accounts highlighted in the New Transactions: All Accounts field of the Transaction Center—Default View 243 of FIG. 18. Interface 323 displays two windows. A New Transaction Summary is the same summary information displayed in the Default View (243) of FIG. 18. The second window is labeled New Transactions and is specific to a single account, in this case a Chase™ Visa credit card account. The transactional information displayed in the New Transactions window shows all the new transactions related to the selected account. The window lists all the transactions that have taken place within a prescribed time period or since the last time a user has accessed the module.

In this example the account is for a major bank credit card as described above and lists five transactions that have occurred over a time period of five days. The information displayed includes the date of the transaction, a description of the entity with whom the transaction was made, the amount of the transaction, and the category associated with the transaction. This screen shot also includes the previously described function buttons Save Categories 317, Transaction History 319, and Bill Payment 321. It is noted herein that the purpose of categorization of all transactions can be used for all kinds of accounting purposes such as automated tax preparation, business auditing, and for solution-oriented summary reports specific to one or more category of transactions.

FIG. 20 is an exemplary screen shot of the Transaction Center: Transaction History/All Accounts interface 324 which is accessed by clicking on the Transaction History button 319 FIG. 18 or FIG. 19. Transaction History interface 324 is a secondary interface that provides an expanded view of all transactions that have occurred over a designated and selectable period of time of a user's on-line transactional activity. The default display for interface 324 includes all transactions listed in chronological order for all registered accounts. In this example interface 324 includes three interactive drop-down menus through which a user may choose to view histories associated with selected options. Account menu 325 includes all the accounts that a user has included in his or her accounts management profile. Timeframe menu 327 enables a user to select a history time period in graduated increments of YTD (Year to Date), this month, last 3 months, last 6 months, last 12 months, and all history. It is noted herein that options for viewing all history and Last 3 months are not illustrated within timeframe window 327, but may be assumed to be present. Moreover, there may be many more timeframes for selection within menu 327 that are illustrated without departing from the spirit and scope the present invention. Furthermore, a user may, through pre-configuration, create specific and personalized timeframes for viewing transactional history.

Menu 329 enables a user to select a specific category of transactions to view in a transaction-history format. Selectable options within menu 329 include but are not limited to a chronological view, view by category, and further options include each individual category that a user has included in his or her accounts management profile. It is noted herein that any selection made with respect to windows 325–329 causes an immediate display of an associated history list in a transaction history window located just below the described menus. Through selecting various entries in the above-described interactive menus, one is able to view the transaction histories in a multiplicity of combinations of accounts, time periods, and categories. Once a user has selected an entry in any one of menus 325–329, an interactive display function 331 enables refreshing the transaction history list displayed in the all accounts window according to the format dictated by the option selected.

In this example, the transaction window lists all user transactions chronologically and displays the date, description, category, account, and amount of the transactions. At the bottom of the transaction listing within the transaction history window is an accumulated expenses total of the transactions displayed. The Transaction History/All Accounts screen shot includes scroll button at the bottom of the screen that allows the user to page to the next screen or return to the previous screen in order to view all transactions over a given time period of the history of the account management. This example includes an Edit Categories function 335 by which a user may edit the all accounts, chronological, and all history default pages to suit the needs of the user. An additional feature in this example is provided in the form of an interactive function enabling a user to chart results. An icon 333 labeled Chart It enables this function. Chart It function 333, once invoked, enables a user to view solution-oriented charts detailing transactions in a chart form rather than the tabular form as displayed herein. More detail regarding the function of the chart feature 333 is provided later in this specification.

FIG. 21 is an exemplary view of an interface that displays Transaction History/All Accounts—by category: YTD 337. This example includes all of the elements and functions thereof described in FIG. 20 above. The transactions listed in the transaction history window in this example are formatted differently than those listed in the transaction history of interface 324 of FIG. 20. In this example, transactions of all user accounts are presented by category. This presentation format is achieved by selecting the All Accounts option in menu 325, the By Category option in menu 329, the YTD option in sub-module 327, and than invoking Display button 321. The data displayed in the transaction history window is formatted according to all three selections as is illustrated in this example.

In a preferred embodiment, many combinations of displayable formats are achievable according to variable selection performed with regard to menus 325–329. For example, by selecting All Accounts in menu 325, last 6 months in menu 327, Auto in menu 329, and then invoking Display button 321, the data presented in the transaction window would reflect only the first two line items currently displayed. Through the selection of any number of combinations of entries in the three drop-down menus, a user is able to format the data presented in the transaction history window in a manner that specifically suits the user's needs. In this example, transactions displayed by category in the transaction history window are supplemented with a total dollar amount by category reported beneath each category. Similarly a YTD expense total is calculated and provided at the bottom of the window. As noted above, Edit Categories button 335 located at the bottom of the transaction history window enables a user to tailor the categories for desired interaction with the accounts selected.

Figure 22:
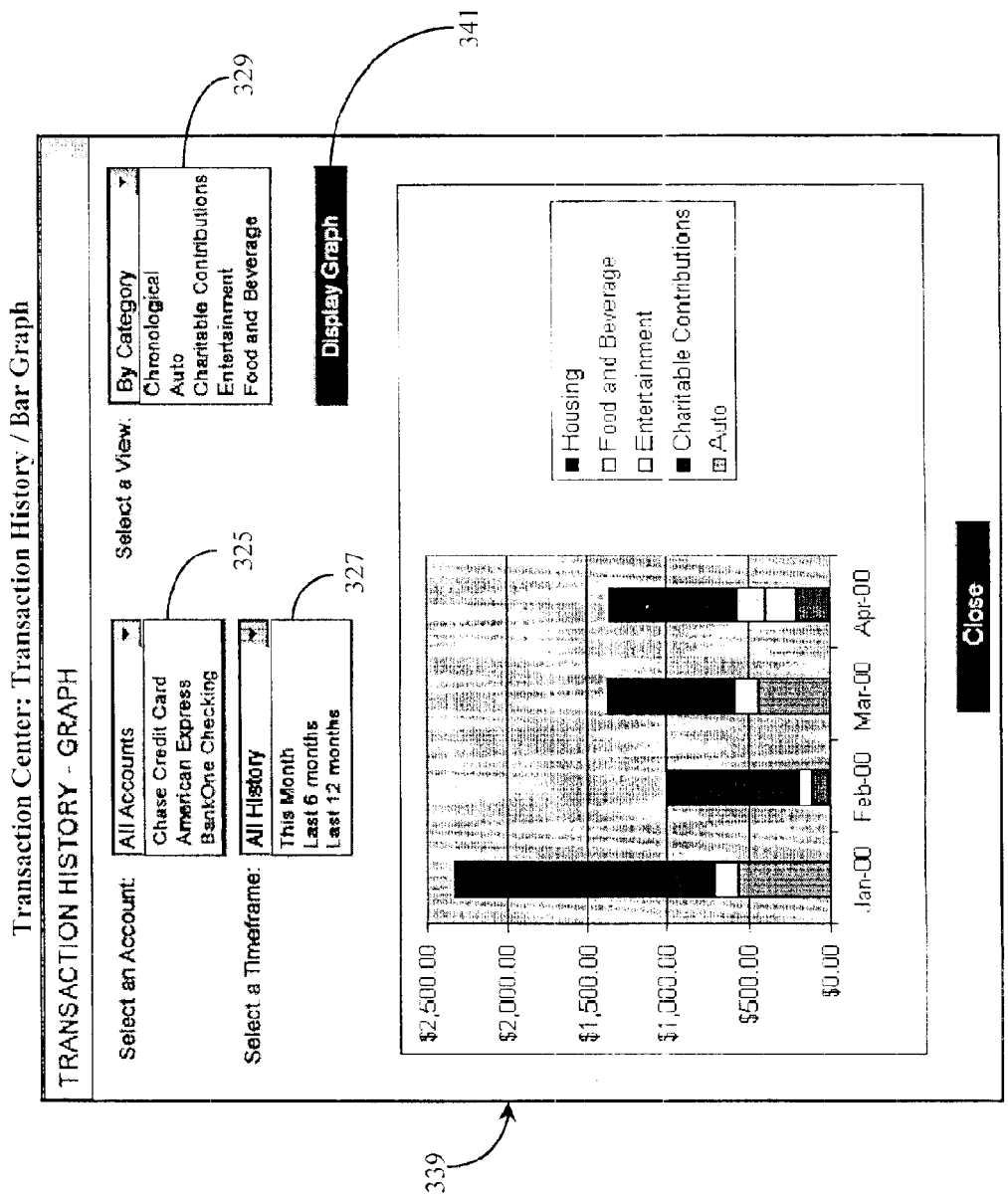
FIG. 22 is an exemplary screen shot of a transaction history/bar graph displayed as a result of user interaction with chart it icon 333 of FIGS. 20 and 21.

FIG. 22 is an exemplary screen shot of a Transaction History/Bar Graph 339 displayed as a result of user interaction with Chart It icon 333 of FIGS. 20 and 21. It is noted herein that the bar graph illustrated in this example appears within the real estate occupied by the transaction history window described in interfaces 324 and 337 of FIGS. 20 and 21 respectively. In one embodiment, only the transaction-window of the described interfaces actually refreshes with new data in the fashion of a results window. However, different element numbers are applied to each represented interface to illustrate a new interface having new data displayed therein as may also be the case in some embodiments.

Interface 339 retains elements 325–329 and icon 341 described in earlier interfaces. In this example, the bar chart represents data calculated and displayed in bar sections representing transaction totals of all accounts, by month, over the last four months. Colors may be used, and the colors used are keyed in a display beside the bar graph. The bar chart representation may be displayed in any of the multiplicity of combinations of selected options available from the three drop-down menus, 325, 327, and 329. It is noted herein that a user may order chart calculation and preparation through previously described icon 333. Display graph icon 341 is intended, in this example, to refresh a same chart configuration that is altered by changes in option section as performed by a user with respect to the options listed in drop-down menus 325–329.

By selecting options in one or more of drop-down menus 325–329, and then invoking display graph icon 341, the real estate of the bar chart area is refreshed and displays a revised bar chart of the same general description indicating the selections of the user. For example, selection combinations may include the last six months of auto expenses paid from all accounts, this month's entertainment expenses paid from a specific bank checking account, or perhaps, the last 12 month's expenses paid from a major credit card for entertainment. An interactive Close icon is provided at the bottom of interface 339 to enable closing of interface 339 upon user invocation thereof.

Figure 23:
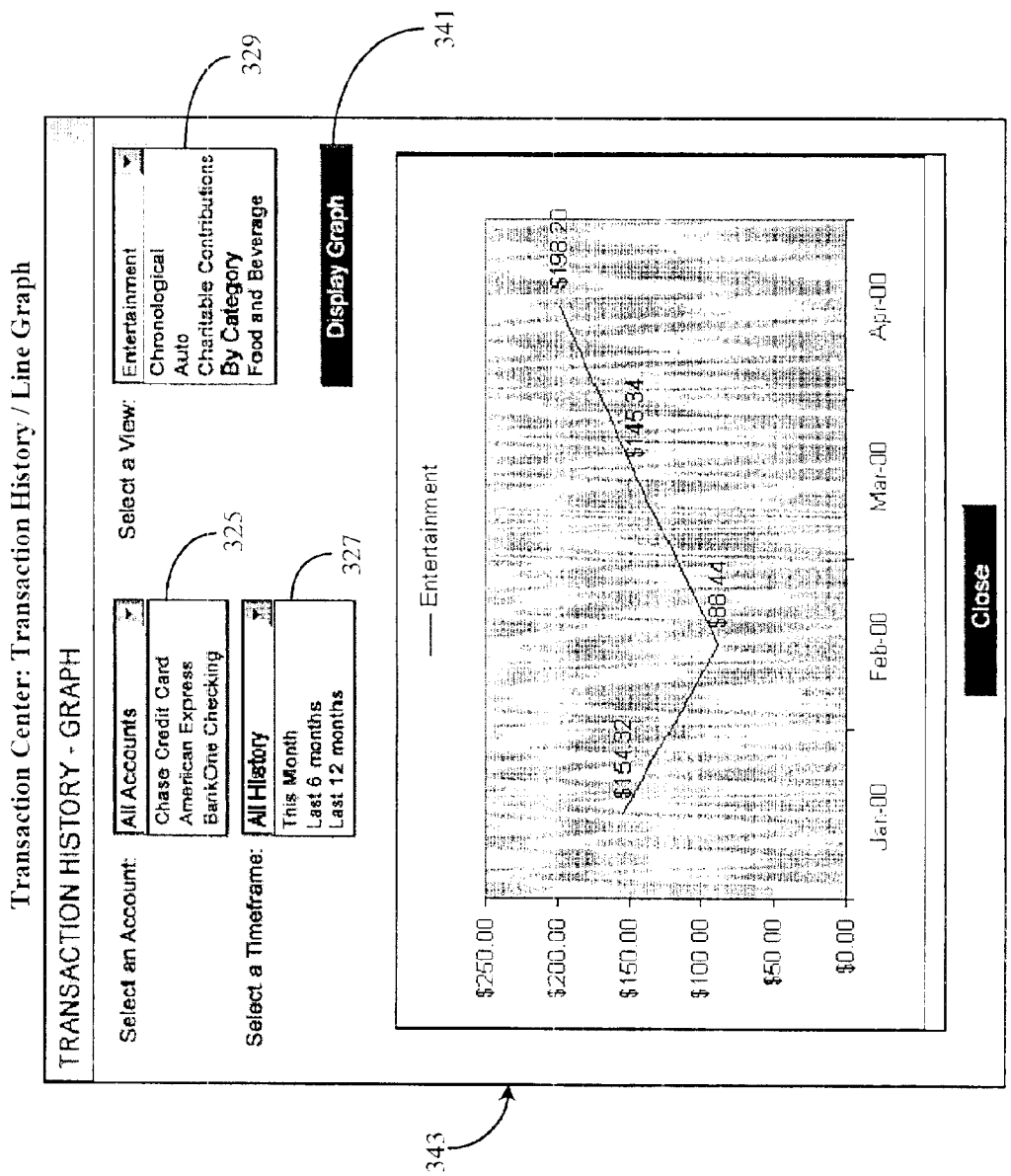
FIG. 23 is an exemplary screen shot of a transaction history/line graph interface.

FIG. 23 is an exemplary screen shot of a Transaction History/Line Graph interface 343. It is noted herein and was described above, that in a preferred embodiment interaction with Chart It icon 333 of FIG. 21 enables chart calculation and preparation according to a general graphics format chosen by a user. Instead of a bar chart, this example illustrates a line graph as a pre-configured choice of graphics display. Within interface 343, the exemplary line graph illustrates data showing a plotted transaction total of entertainment transactions plotted by month with the totals of 4 months visible. As described above with respect to FIG. 22, the chart display may be modified by selecting any one of the combinations of options provided in the three drop-down menus 325, 327, and 329 and then invoking display graph icon 341. Such data alterations may reflect user choices to display the transaction totals of a major credit card, a bank checking or savings account, or any of the other listed accounts specified to be included in account management capability. In the same manner just-described, options may be selected to cause display of a line graph of auto expenses over time, charitable expenses for the last 12 months, food and beverage over the last six months, or any other selectable combinations that may be displayed as a line graph.

It will be apparent to one with skill in the art that the transaction center module of FIG. 17 as illustrated and described in this specification provides all the mechanisms for summarizing, tracking, categorizing, listing, and charting any and all transactions designated by a user to be included in the accounts management functionality of a single user interface accessible from an Internet-capable appliance. The information and history provided through the transaction center module of the present invention is updated and available to the user each time the user accesses the module and operates through the various secondary interfaces described. In various embodiments, data viewable through the transaction center module is updated by a request-refresh action, through on-demand ordering, through periodic push of data and in real time as transactions occur and are detected. There are many and varied possibilities.

It will also be apparent to one with skill in the art that the transaction center module and functional sub-interface accessible therefrom may be interfaced with a database reporting engine such as engine 155 of FIG. 8 by API or other methods, or to equivalent software functioning as database software resident on a machine having access to user's aggregated data and account information.

The method and apparatus of the present invention may be practiced via private individuals on the Internet, businesses operating on a WAN connected to the Internet, businesses operating via private WAN, and so on. There are many customizable situations. The present invention as taught herein and above should be afforded the broadest of scope. The spirit and scope of the present invention is limited only by the claims that follow.

What is claimed is:

1. In a software suite for enabling viewing and manipulation of multiple categories of aggregated data compiled from a plurality of data sources and accessible through a single interfacing node operated on a data-packet-network, a transaction module having a displayable summary interface comprising:

an interactive main interface accessible through the summary interface, the main interface for listing new transactions related to registered financial accounts;

an interactive history link embedded in the main interface for providing access to a secondary interface for viewing transaction history;

an interactive menu provided within the main interface for assigning categories to the listed transactions;

an interactive save feature for saving category assignments to the listed transactions;

a interactive bill-payment link provided within the main interface for linking the interface to a bill-payment module; and an interactive transfer-funds link provided within the summary interface of the module for linking the summary face of the module to a secondary interface for transferring funds from one account to another, characterized in that a user operating the main interface from a remote node having access to the data-packet-network may view all transactions according to option of category, account, and time period.

2. The transaction module of claim 1, wherein the data-packet-network is the Internet network.

3. The transaction module of claim 2, wherein the plurality of data sources are services accessible over the Internet and subscribed to by the operating user.

4. The transaction module of claim 3, wherein the accessible services are hosted in file servers addressed on the Internet network.

5. The transaction module of claim 4, wherein the remote node is a personal computer with accessibility to the Internet.

6. The transaction module of claim 5, wherein the summary, main and secondary interfaces are provided in the form of hyper-text-markup-language.

7. The transaction module of claim 4, wherein the remote node is a cellular telephone with accessibility to the Internet.

8. The transaction module of claim 4, wherein the remote node is a hand-held computer with accessibility to the Internet.

9. The transaction module of claim 4, wherein the interactive menu within the main interface contains a selectable list of transaction categories including food and beverage, utilities, home, auto, charitable contribution, and entertainment.

10. The transaction module of claim 9, wherein the secondary interface invoked from the interactive history link contains a plurality of interactive menus, the menus containing selectable options for categorical viewing of transaction history.

11. The transaction module of claim 10, wherein the selectable options enable viewing transactions by a specific account, a specified timeframe, and by a selected category, the options selectable for ordering combinations of criteria for producing a transaction view.

12. The transaction module of claim 11, wherein the graphics chart ordered and displayed is alterable by changing selection of options within the plurality of interactive menus in the secondary interface and refreshing the interface.

13. The transaction module of claim 10, further comprising a charting feature for rendering a transactional view in the form of a graphics chart.

14. An interactive transaction viewing system for enabling online viewing of itemized transactions performed across disparate on-line accounts and services over a data-packet-network comprising:

a first server node connected to the network, the server node providing a service-access-point for accessing users;

a second server node connected to the network and accessible to the first server node, the second server node providing automated navigation, data procurement, and data aggregation on behalf of the accessing users;

a plurality of server nodes connected to the network and accessible to the second server node, the server node functioning as data sources for the data procurement and aggregation; and a transaction viewing software interface installed on the first server node, the interface accessible to the accessing users connected to the network by respective remote computer nodes, characterized in that users accessing the first server node from the remote computer nodes interact with the transaction viewing interface for the purpose of viewing transactions according to ordered category and graphical presentation option, the transactions entered manually or detected automatically through system update and or user request, the transaction compiled and aggregated by proxy using cooperative functions of the first and second server nodes.

15. The interactive transaction-viewing system of claim 14, wherein the data-packet-network is the Internet network.

16. The interactive transaction-viewing system of claim 15, wherein the first server node is a portal server providing a personalized interfaces of the form of hyper-text-markup-language interfaces.

17. The interactive transaction-viewing system of claim 16, wherein the on-line accounts and services are accessible over the Internet and subscribed to by the accessing users.

18. The interactive transaction-viewing system of claim 17, wherein the remote computer nodes are personal computers with accessibility to the Internet.

19. The interactive transaction-viewing system of claim 17, wherein the remote computer nodes are cellular telephones with accessibility to Internet.

20. The interactive transaction-viewing system of claim 17, wherein the remote computer nodes are hand-held computers with accessibility to the Internet.

21. The interactive transaction-viewing system of claim 17, wherein the second server node stores aggregated data in a connected data repository held externally from the server.

22. The interactive transaction-viewing system of claim 21, wherein the transaction-viewing software interface is linked to at least one secondary interface provided in the form of hyper-text-markup-language.

23. The transaction viewing system of claim 22, wherein an interactive menu is accessible from within the transaction viewing interface, the menu containing a selectable list of transaction categories including food and beverage, utilities, home, auto, charitable contribution, and entertainment, each category assignable to a selected transaction listed in the interface, the assignments savable to the system.

24. The transaction viewing system of claim 23, wherein a secondary interface accessible from interaction in the main interface contains a plurality of interactive menus, the menus containing selectable options for categorical viewing of transaction history.

25. The transaction-viewing system of claim 24, wherein the selectable options enable viewing transactions by a specific account, a specified timeframe, and by a selected category, the options selectable for ordering combinations of criteria for producing a transaction view, the transaction view comprising an ordered history view.

26. The transaction-viewing system of claim 25, further comprising a charting feature associated with the selectable options, the charting feature for rendering a transactional view in the form of a graphics chart.

27. The transaction-viewing system of claim 26, wherein the graphics chart ordered and displayed is alterable by changing selection of options within the plurality of interactive menus in the secondary interface and refreshing the interface.

* * * * *